(12) United States Patent
Hubbard et al.

(10) Patent No.: US 11,327,951 B2
(45) Date of Patent: May 10, 2022

(54) SYSTEMS AND METHODS FOR WEATHER DATA DISTRIBUTION

(71) Applicant: Whether or Knot LLC, Eden Prairie, MN (US)

(72) Inventors: David James Hubbard, Chaska, MN (US); Craig Allen Mataczynski, Spooner, WI (US)

(73) Assignee: Whether or Knot LLC, Eden Praire, MN (US)

( * ) Notice: Subject to any disclaimer, the term of this patent is extended or adjusted under 35 U.S.C. 154(b) by 93 days.

(21) Appl. No.: 16/554,174

(22) Filed: Aug. 28, 2019

(65) Prior Publication Data

US 2020/0151162 A1    May 14, 2020

Related U.S. Application Data

(63) Continuation of application No. 15/205,646, filed on Jul. 8, 2016, now Pat. No. 10,437,814.

(Continued)

(51) Int. Cl.
*H04L 67/50* (2022.01)
*H04L 67/10* (2022.01)
(Continued)

(52) U.S. Cl.
CPC ........ *G06F 16/2365* (2019.01); *G06F 16/215* (2019.01); *G06F 16/9537* (2019.01); *H04L 63/102* (2013.01); *H04L 67/04* (2013.01); *H04L 67/06* (2013.01); *H04L 67/10* (2013.01); *H04L 67/12* (2013.01); *H04L 67/125* (2013.01); *H04L 67/18* (2013.01); *H04L 67/20* (2013.01); *H04L 67/22* (2013.01); *H04L 67/2842* (2013.01);
(Continued)

(58) Field of Classification Search
USPC ....................................... 707/690
See application file for complete search history.

(56) References Cited

U.S. PATENT DOCUMENTS 8,819,080 B2   8/2014   Modad et al.
8,855,664 B2   10/2014  Gao et al.
(Continued)

FOREIGN PATENT DOCUMENTS

KR   10-2006-0080301 A   7/2006
WO   WO 2014-148959       9/2014

OTHER PUBLICATIONS

Non-Final Office Action for U.S. Appl. No. 16/567,846 dated Oct. 1, 2020, 11 pages.

(Continued)

*Primary Examiner* — Frantz B Jean
(74) *Attorney, Agent, or Firm* — Christopher J. Volkmann; Kelly, Holt & Christenson, PLLC

(57) ABSTRACT

In one example, a computer-implemented method of generating a weather product is disclosed that comprises receiving a product generation input, the product generation input being indicative of a weather product. The method further comprises retrieving a weather data point, based on the product generation input. Further, the method comprises analyzing the weather data point with a weather analysis component to identify weather parameters relevant to the weather product. In addition, the method comprises generating the weather product to include the identified relevant weather parameters.

20 Claims, 19 Drawing Sheets

Related U.S. Application Data

(60) Provisional application No. 62/191,025, filed on Jul. 10, 2015, provisional application No. 62/191,017, filed on Jul. 10, 2015, provisional application No. 62/191,001, filed on Jul. 10, 2015, provisional application No. 62/191,030, filed on Jul. 10, 2015.

(51) Int. Cl.

| | | |
|---|---|---|
| *G06F 16/23* | (2019.01) | |
| *H04L 29/06* | (2006.01) | |
| *H04L 69/22* | (2022.01) | |
| *H04L 67/60* | (2022.01) | |
| *G06F 16/215* | (2019.01) | |
| *G06F 16/9537* | (2019.01) | |
| *H04L 67/53* | (2022.01) | |
| *H04L 67/125* | (2022.01) | |
| *H04L 67/04* | (2022.01) | |
| *H04L 67/12* | (2022.01) | |
| *H04L 67/568* | (2022.01) | |
| *H04L 67/52* | (2022.01) | |
| *H04L 67/06* | (2022.01) | |
| *H04W 84/18* | (2009.01) | |

(52) U.S. Cl.
CPC .............. *H04L 67/32* (2013.01); *H04L 69/22* (2013.01); *H04W 84/18* (2013.01); *Y02P 90/845* (2015.11)

(56) References Cited

U.S. PATENT DOCUMENTS

| | | |
|---|---|---|
| 9,053,468 B2 | 6/2015 | Haynes et al. |
| 9,118,732 B2 | 8/2015 | Ji et al. |
| 9,239,997 B2 | 1/2016 | Bobo et al. |
| 9,262,370 B2 | 2/2016 | Hofstaedter et al. |
| 9,262,719 B2 | 2/2016 | Soon-Shiong |
| 9,344,285 B2 | 5/2016 | Gorecki et al. |
| 9,361,630 B1 | 6/2016 | Goswami |
| 9,378,601 B2 | 6/2016 | Ricci |
| 9,390,391 B2 | 7/2016 | Dembo |
| 9,406,336 B2 | 8/2016 | Bose et al. |
| 9,418,339 B1 | 8/2016 | Leonard et al. |
| 9,448,623 B2 | 9/2016 | Fein et al. |
| 9,454,599 B2 | 9/2016 | Golden et al. |
| 9,516,141 B2 | 12/2016 | Dubois et al. |
| 9,538,332 B1 | 1/2017 | Mendelson |
| 9,542,412 B2 | 1/2017 | Bates-Haus et al. |
| 9,559,804 B2 | 1/2017 | Ibrahim et al. |
| 9,572,533 B2 | 2/2017 | Venkatraman et al. |
| 9,582,739 B2 | 2/2017 | Padubrin |
| 9,594,152 B2 | 3/2017 | Ryan et al. |
| 9,613,074 B2 | 4/2017 | Farahbod et al. |
| 9,635,349 B2 | 4/2017 | Godavarty et al. |
| 9,645,736 B2 | 5/2017 | Chen et al. |
| 9,665,475 B2 | 5/2017 | Suttle et al. |
| 9,743,253 B2 | 8/2017 | Heikkila et al. |
| 9,847,038 B2 | 12/2017 | Mayou et al. |
| 9,852,512 B2 | 12/2017 | Gonzalez-Banos et al. |
| 9,874,923 B1 | 1/2018 | Brown et al. |
| 9,876,953 B2 | 1/2018 | Bagnato et al. |
| 9,882,592 B2 | 1/2018 | O'Hagan et al. |
| 9,892,206 B2 | 2/2018 | Levy |
| 9,947,033 B1 | 4/2018 | Stickle et al. |
| 9,973,834 B1 | 5/2018 | Manzella et al. |
| 10,025,337 B2 | 7/2018 | Hancock et al. |
| 10,062,411 B2 | 8/2018 | Hay et al. |
| 10,075,828 B2 | 9/2018 | Horton et al. |
| 10,078,658 B2 | 9/2018 | Hubbard et al. |
| 10,101,273 B2 | 10/2018 | Ja |
| 10,263,841 B1 | 4/2019 | Stamatakis et al. |
| 10,371,400 B2 | 8/2019 | Quam et al. |
| 10,397,013 B1 | 8/2019 | Hill et al. |
| 10,419,890 B2 | 9/2019 | Edge et al. |
| 10,536,570 B2 | 1/2020 | Nalluri et al. |
| 10,542,093 B2 | 1/2020 | Ayyagari et al. |
| 10,567,909 B2 | 2/2020 | Singh |
| RE48,056 E | 6/2020 | Hoffberg et al. |
| 10,700,774 B2 | 6/2020 | Panther et al. |
| 2001/0027479 A1 | 10/2001 | Delaney et al. |
| 2007/0214023 A1 | 9/2007 | Mathai et al. |
| 2007/0282687 A1 | 12/2007 | Laves |
| 2008/0140318 A1 | 6/2008 | Breed |
| 2008/0256549 A1 | 10/2008 | Liu et al. |
| 2008/0313207 A1 | 12/2008 | Modad et al. |
| 2009/0164304 A1 | 6/2009 | Otto et al. |
| 2009/0316671 A1* | 12/2009 | Rolf .................. H04W 4/02 370/338 |
| 2010/0013629 A1 | 1/2010 | Sznaider et al. |
| 2011/0029398 A1 | 2/2011 | Bondville |
| 2012/0053829 A1* | 3/2012 | Agarwal .............. G06F 16/29 701/418 |
| 2012/0109851 A1* | 5/2012 | Sanders ............... G06Q 10/08 705/400 |
| 2012/0197856 A1 | 8/2012 | Banka et al. |
| 2012/0215446 A1 | 8/2012 | Schunder et al. |
| 2012/0272176 A1* | 10/2012 | Nielsen ............... G06F 16/9032 715/779 |
| 2012/0323661 A1 | 12/2012 | Otto et al. |
| 2012/0323662 A1 | 12/2012 | Otto et al. |
| 2014/0058572 A1 | 2/2014 | Stein et al. |
| 2014/0067938 A1 | 3/2014 | Boldyrev et al. |
| 2014/0074674 A1 | 3/2014 | Deng et al. |
| 2014/0108179 A1 | 4/2014 | Zhu et al. |
| 2014/0108258 A1 | 4/2014 | Williams |
| 2014/0122045 A1 | 5/2014 | Mewes et al. |
| 2014/0123589 A1 | 5/2014 | Boccon-Gibod |
| 2014/0304519 A1 | 10/2014 | Gorecki et al. |
| 2014/0359552 A1 | 12/2014 | Misra et al. |
| 2014/0379668 A1 | 12/2014 | Sinha et al. |
| 2015/0163945 A1 | 6/2015 | Barton et al. |
| 2015/0221191 A1 | 8/2015 | Doyle et al. |
| 2015/0330923 A1 | 11/2015 | Smullin |
| 2015/0348591 A1 | 12/2015 | Kaps et al. |
| 2016/0086284 A1 | 3/2016 | Ghosh et al. |
| 2016/0147826 A1 | 5/2016 | Mishra |
| 2016/0155332 A1 | 6/2016 | Wang |
| 2016/0162980 A1 | 6/2016 | Oldre |
| 2016/0210534 A1 | 7/2016 | Padubrin |
| 2016/0217588 A1 | 7/2016 | Hay |
| 2016/0274770 A1 | 9/2016 | Lovati et al. |
| 2016/0292509 A1 | 10/2016 | Kaps et al. |
| 2016/0314255 A1 | 10/2016 | Cook et al. |
| 2016/0342593 A1 | 11/2016 | Raichelgauz et al. |
| 2016/0343093 A1 | 11/2016 | Riland et al. |
| 2017/0006135 A1 | 1/2017 | Siebel et al. |
| 2017/0008521 A1* | 1/2017 | Braunstein ......... G06K 9/00791 |
| 2017/0011053 A1 | 1/2017 | Hubbard et al. |
| 2017/0013047 A1 | 1/2017 | Hubbard et al. |
| 2017/0031449 A1 | 2/2017 | Karsten et al. |
| 2017/0132866 A1 | 5/2017 | Kuklinski et al. |
| 2017/0188238 A1 | 6/2017 | Nagamatsu |
| 2017/0201545 A1 | 7/2017 | Nicodemus et al. |
| 2017/0230462 A1 | 8/2017 | Ascheid et al. |
| 2017/0308672 A1 | 10/2017 | Martin et al. |
| 2017/0374522 A1 | 12/2017 | Root et al. |
| 2018/0011682 A1 | 1/2018 | Ross |
| 2018/0027362 A1 | 1/2018 | Renkis |
| 2018/0232052 A1 | 8/2018 | Chizeck et al. |
| 2019/0020530 A1 | 1/2019 | Au et al. |
| 2019/0121799 A1 | 4/2019 | Hubbard et al. |
| 2020/0142885 A1 | 5/2020 | Hubbard et al. |

OTHER PUBLICATIONS

Notice of Allowance for U.S. Appl. No. 16/043,792 dated Jun. 14, 2019, 7 pages.

Extended European Search Report for European Patent Application No. 16824950.6 dated Nov. 26, 2018, 10 pages.

Jeremy Scott: "How Does YouTube Work? Time Warner Infographic Breaks It Down", Sep. 15, 2010, Retrieved at <https://

(56) References Cited

OTHER PUBLICATIONS tubularinsights.com/how-youtube-works-infographic/>, Retrieved on Nov. 9, 2018, 2 pages.
First Examination Report for Australian Patent Application No. 2016293819 dated Sep. 27, 2018, 4 pages.
Notice of Allowance for U.S. Appl. No. 15/205,663 dated Jul. 17, 2018, 5 pages.
Application and Drawings for U.S. Appl. No. 16/043,792, filed Jul. 24, 2018, 79 pages.
Office Action for Canadian Patent Application 2,991,905 dated Oct. 2, 2018, 4 pages.
Amendment for U.S. Appl. No. 15/205,663 dated May 29, 2018, 15 pages.
Non-Final Office Action for U.S. Appl. No. 15/205,663 dated Feb. 26, 2018, 11 pages.
International Preliminary Report on Patentability for International Patent Application No. PCT/US2016/041583, 9 pages.
International Preliminary Report on Patentability for International Patent Application No. PCT/US2016/041575, 10 pages.
International Search Report and Written Opinion for International Patent Application No. PCT/US2016/041583, dated Sep. 12, 2016, date of filing: Jul. 8, 2016, 12 pages.
International Search Report and Written Opinion for International Patent Application No. PCT/US2016/041575, dated Oct. 18, 2016, date of filing: Jul. 8, 2016, 15 pages.
Prosecution History for U.S. Appl. No. 15/205,646 including: Notice of Allowance dated May 30, 2019, Amendment with RCE dated May 20, 2019, Final Office Action dated Jan. 18, 2019, Amendment filed Nov. 21, 2018, Non-Final Office Action dated Jun. 29, 2018, and Application and Drawings filed Jul. 8, 2016, 168 pages.
Prosecution History for U.S. Appl. No. 16/043,792 including: Corrected Notice of Allowance dated Aug. 21, 2019 and Preliminary Amendment filed Jan. 9, 2019, 11 pages.
Application and Drawings for U.S. Appl. No. 16/567,846, filed Sep. 11, 2019, 79 pages.
Communication Pursuant to Article 94(3) for European Patent Application No. 16824950.6 dated Dec. 20, 2019, 5 pages.
Amendment filed for U.S. Appl. No. 16/567,846, dated Feb. 1, 2021, 15 pages.
Notice of Allowance for U.S. Appl. No. 16/567,846, dated Apr. 14, 2021, 5 pages.

* cited by examiner

SYSTEMS AND METHODS FOR WEATHER DATA DISTRIBUTION

The present application is a continuation of and claims priority of U.S. patent application Ser. No. 15/205,646, filed Jul. 8, 2016, now U.S. Pat. No. 10,437,814, which is based on the benefit of priority of the following U.S. provisional patent applications with Ser. Nos. 62/191,001 filed Jul. 10, 2015; 62/191,017 filed Jul. 10, 2015; 62/191,025 filed Jul. 10, 2015; and 62/191,030 filed Jul. 10, 2015, the contents of which are hereby incorporated by reference in their entirety.

BACKGROUND

The present disclosure generally relates to data valuation, and more specifically but not by limitation, techniques for converting data contributions to distributable forms of data currency. Currently, a tremendous amount of data is collected on a daily basis. Data is most commonly collected at a specific source, such as a mobile device, and used for an application on that device and specific to the collection method. For example, some mobile devices collect accelerometer and proximity sensor data. A proximity detection application may use the collected data to detect that the device was moved along a z-axis and is now proximate a surface. The application may then determine that a user is holding the device near the user's ear to place a phone call. In response, the application might instruct the display screen to ignore touch inputs while the call is being placed in order to prevent unwanted inputs from the user's face and ears.

SUMMARY

In one example, a computer-implemented method of generating a weather product is disclosed that comprises receiving a product generation input, the product generation input being indicative of a weather product. The method further comprises retrieving a weather data point, based on the product generation input. Further, the method comprises analyzing the weather data point with a weather analysis component to identify weather parameters relevant to the weather product. In addition, the method comprises generating the weather product to include the identified relevant weather parameters.

This Summary is merely provided to quickly aid in understanding of the subject matter described herein. This Summary is not intended to limit the scope and content of the subject matter presented in the remainder of this disclosure, nor is it intended to limit the scope of the claims. Rather, this Summary aims to highlight some of the embodiments that may be provided, along with at least some of the possible advantages that may coincide with these embodiments. Lastly, the claimed subject matter described herein is not limited to any discussion presented in the background section.

DETAILED DESCRIPTION OF ILLUSTRATIVE EMBODIMENTS

Figure 1:
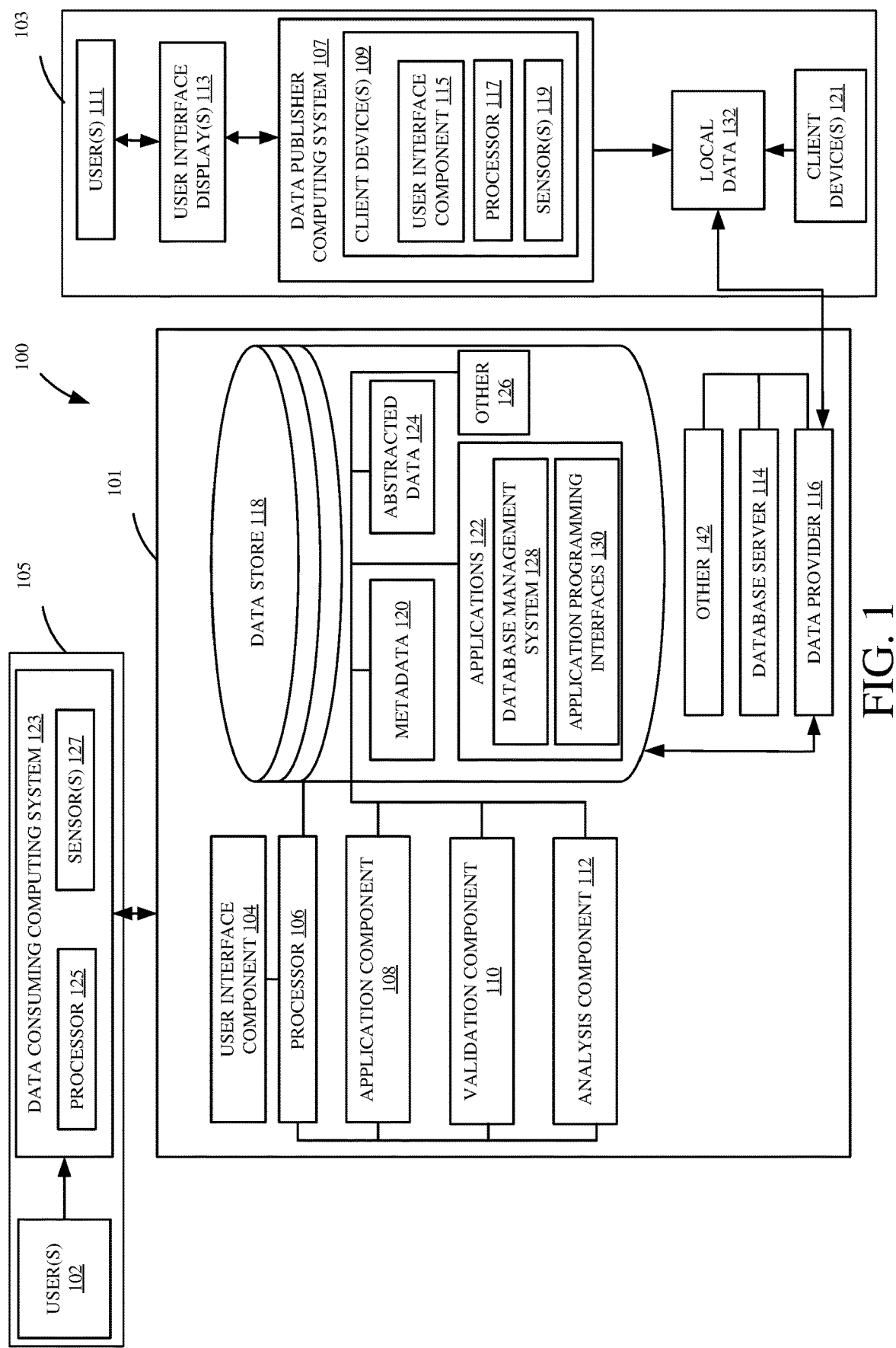
FIG. 1 illustrates one embodiment of a weather computing environment in which embodiments described herein are applicable.

There may be a variety of sources of weather-related information. These sources may be mobile phones, computing systems, automobiles, sensors associated with these devices, etc. These sources may have the capability of collecting weather-related information. For instance, a mobile phone obtains temperature data while the device is running other operations. A car may obtain precipitation information while traveling down the highway. An office building may obtain solar availability information. However, these sources may use this data for non-weather-related processes or systems, and then discard it. For example, the mobile phone uses the temperature data to program a device shut-down procedure when it is cold outside (i.e. to preserve battery life). The car may use the precipitation information for controlling windshield wipers. The office building may use solar information to control energy use. However, such weather-related information may be valuable to other users or systems. For instance, a user that is traveling down the same highway as the car may have a desire for accurate weather information ahead (e.g. presence of hail, duration of rainfall, depth of snow coverage). The car, for instance, may be a source of information that may benefit the user. Similarly, a user in the same vicinity as the mobile phone may want a detailed temperature map of the surrounding area. A system disclosed may be able to utilize such information by capturing it and providing it to another entity with a use for it.

Embodiments described herein generally provide systems and methods for obtaining, analyzing, and providing data from different data sources. More specifically, but not by limitation, the present disclosure relates to assigning distribution value to weather data contributions and providing the distribution value to a supplier of the local weather data. Certain embodiments thus provide a way to convert data published by disparate data sources, such as multiple applications on multiple mobile devices (i.e. mobile device proximity application data and aircraft system data), to a distributable form of currency. In return for providing the data, sources may be provided the distributable currency as a form of compensation.

Conventional weather reporting systems utilize data provided by pre-determined weather stations. For instance, the reporting systems are in communication with sensors or probes that are located at a set number of research sites. Either manually, or by using conventional prediction systems, the weather data may be used in an attempt to extrapolate forecasts. However, a set number of sensors positioned at known locations limits the quantity and quality of weather data. In addition, as the distance away from said locations increases, the quantity and quality of weather data decreases. This makes it difficult to generate accurate weather reports. There may be weather-related information available through other collection methods and this may be information that would otherwise go unused.

There is an increasing amount of data that goes unused after its initial purpose is fulfilled. There are also many devices, sensors, and systems that may be capable of caching data beyond an initial purpose. These may be implemented in systems for limited data use. In other words, data is often used for its intended collection purpose and then rendered useless. For instance, once accelerometer or temperature sensor data is used by an application running locally, the data may be stored in a cache or a volatile random access memory (RAM) memory. If the data is not briefly stored in device memory, it may be discarded.

For example, aircraft systems collect various temperature and sensor data while performing routine flight operations. This sensor data may be used by applications local to the aircraft command systems in order to calibrate aircraft instruments and generate weather maps for flight crews. Some locally collected data could, instead, also be provided to non-local sources. As more data is generated and collected on a daily basis by an increasing number of users, certain techniques aim to control data storage and collection. Although traditional local storage techniques remain prevalent, recent developments allow for storage at remote locations. For example, cloud architectures allow data to be maintained, managed, backed up remotely, and made available to users over a network. In the context of aircraft systems, certain temperature and static pressure sensor data may be provided to the Aircraft Meteorological Data Relay (AMDR). In other words, the AMDR is a non-local source to the aircraft command system. While these and similar architectures may overcome certain challenges of data collection, the majority of current data collection is specific to an envisaged one-time use for a specific application, where the application and data management techniques are local to the source at which the data collection occurs.

In another example, some mobile devices have sensors that detect temperature. A battery performance application on the mobile device may collect temperature data, for instance, to analyze battery charge performance in varying environment conditions. However, the collected temperature data, along with the ability to collect temperature data, may have other value. For example, the data may be valuable to clients desiring substantially real-time and accurate weather heat map or a meteorological weather service product near the mobile device in question.

As devices, systems, sensors, and users become increasingly connected through networks, such as the Internet of Things (IoT), more data is available for use and analysis beyond its initial purpose. One advantage provided by the embodiments discussed herein is the ability to provide systems and methods that collect data from a variety of different data sources and provide interfaces for analyzing and managing the data for purposes beyond that of the initial envisaged purpose.

There are many challenges associated with accessing, compiling, storing, and analyzing data from a plurality of disparate data sources. Perhaps the largest challenge is that indexing data from many disparate data sources may require a data hosting platform with extremely high processing capabilities. Upon indexing the data, it would be inconvenient to design programming interfaces that apply to all types of data collection and management. Another challenge is data privacy. Users may be reluctant to subscribe to services or platforms that request the use of personal data. There is a heightened awareness of data privacy which may leave users with a predisposition that impedes them from agreeing to data subscription services. Moreover, data sources (e.g. a user) often have no motivation to allow use of collected data. Lastly, accurate data from a valid source presents a challenge as to reliability.

Embodiments of the present disclosure provide methods and systems that address these challenges. Certain embodiments are directed to a weather distribution platform that enables processing and handling of large volumes of weather data from many disparate data sources, allows for distributed production of weather programming interfaces, provides incentive, exchangeable credit, and a degree of anonymity for participation in the weather information collection process, and ensures that the weather data retained in the weather distribution system is reliable.

Before discussing particular embodiments in detail, a brief overview of the present disclosure is presented. Compiling a large amount of data to a single location may require large processing and storage capabilities at that location. This may also cause an increase in network latency and bandwidth consumption, thereby decreasing performance of a network and/or a database with heavy data packet transfer. To address this problem, embodiments of the present disclosure provide, for example, distributed hosting and distributed database management that may farm-out database hosting for the collection and storage of data using a plurality of different data sources. One such way of doing so, as discussed in further detail below, is by providing a virtualized database management system that operates through distributed hosting of a plurality of centralized and/or distributed databases.

Managing and analyzing data may present similar challenges. While some systems utilize a single, specific programming interface for performing data management and analysis operations, such an interface would be unreasonable when collecting a variety of data types from a variety of data sources (e.g. various centralized or distributed database systems). This is because, in one embodiment, query inputs, hierarchical tree structures, and collection methods are specific to particular databases and their applications. For example, a consumer market analysis application may collect and analyze data stored at a consumer market database. The consumer market database and associated applications may have properties (e.g. query inputs, tree structures, etc.) that are optimized for consumer market information. To the contrary, embodiments of the present disclosure are not limited to a particular data type or a particular data source and may be implemented across a variety of different quantities and qualities of data. One way of achieving this feature is by providing programmers the tools and framework to develop program interfaces. These interfaces may be customizable for different data collections at different distributed databases. This may improve the efficiency of collecting and managing data from a variety of different sources.

While distributed hosting and application program interface (API) development may provide data collection and management solutions, there are several challenges related to data access. One particular challenge is the concern for data privacy. Another is providing an incentive for participation. Embodiments of the present disclosure may copy some or all of the original data from the user. This whole or partial copy comprises, in one embodiment, generated metadata and/or abstracted data forms, for example. As such, the original data item may be left at the collection location, which may provide several advantages. Along with increasing storage space by only obtaining a portion of the original data, in one embodiment, the system removes any potentially compromising security information. To provide incentive to the data source for agreeing to publish data to the distribution system, embodiments described herein may allow a computing system to analyze the data based on the accuracy, the validity, and/or other distribution metrics. Based on the distribution metrics, the system may provide fair and reasonable distribution value to the data source, in one embodiment. The distribution value may also be evaluated against similar data that is contributed by the same or other data sources. Analyzing the data for accuracy and validity also ensures that the collected data will be useful in generating a reliable weather-related product. Embodiments and advantages of the present disclosure will now be discussed in further detail below.

FIG. 1 illustrates one embodiment of a weather computing architecture 100 in which embodiments described herein are applicable. Weather computing architecture 100 comprises a weather data distribution system 101, a data publisher environment 103, and a data consumer environment 105.

Data publisher environment 103 comprises a data publisher computing system 107 which can include one or more client devices 109 accessed by one or more users 111. User(s) 111 interact with user interface display(s) 113 generated by a user interface component 115. System 107 also includes one or more processor(s) 117, and one or more sensor(s) 119. For instance, client device 109 is a mobile computing device that user 111 interacts with via a touch via a touch-screen interface. Sensor(s) 119 may be a variety of sensors or transceivers associated with client device 109 and configured to obtain data indications. For instance, sensor 119 comprises a temperature sensor, location sensor (e.g. GPS), etc.

Data publisher environment 103 comprises a variety of users and client devices (e.g., devices 109, 121, etc.) that publish data contributions to a data provider 116 of system 101.

For instance, system 101 includes local data sources (e.g. local data sources 300 as shown with respect to FIG. 3) that have agreed to contribute data to local data 132. In addition, or alternatively, client device(s) 121 may contribute (e.g. publish) to local data 132. The client device(s) can include devices that a user directly interacts with (i.e., client device 109) as well as devices that a user does not directly interact with (e.g., client device 121).

System 101 may thus receive local data 132 (e.g. data contributions) with data provider 116. The system 101 may use data contributions received at the provider to ultimately generate one or more distributable products, that are distributable to data consuming environment 105.

As shown in FIG. 1, a data consuming computing system 123 of environment 105 comprises one or more processors 125 and one or more sensor 127. Data consuming computing system 123 and receive and utilize the distributable products. Examples include, but are not limited to, summaries, reports, or otherwise raw information that represents or is otherwise associated with the data contributions. These distributable products are consumed or used by user(s) 102 of environment 105. For instance, user(s) 102 interact with data consuming computing system 123 to request a data contribution. System 101 is configured to receive the request for a distributable product, which may be indicative of a desired data contribution. Once the request is received, system 101 may process local data 132, and provide a product for consumption by user(s) 102.

Computing system 101 is accessible by one or more users through one or more user interfaces generated by user interface component 104 For instance, users may access computing system 101 locally or remotely. In one embodiment, one or more users may access computing system 101 through a client device that communicates with computing system 101 over a network connection. A network connection (e.g. as shown with respect to FIG. 12) may comprise, in one embodiment, any of a wide area network (WAN), a local area network (LAN), an Internet area network (IAN), or other suitable network configuration. Users may control and interact with computing system 101 in order to access data stored in data store 118. For instance, users may read, write, update, modify, and/or delete data in data store 118.

In one embodiment, computing system 101 comprises a processor 106. Processor 106, in one embodiment, is a functional part of computing system 101. Processor 106 may be activated by, and facilitate the functionality of, other systems and components in system 101. Computing system 101 may also comprise database server 114. Database server 114 may, in one embodiment, be configured to facilitate database services for data store 118. In one embodiment, processor 106 is activated by, and facilitates the functionality of database server 114. Processor 106 may also be, in one embodiment, deployed on or separate from database server 114

Computing system 101 further comprises, in one embodiment, application component 108. Application component 108 may provide functionality that allows user 102 interact with data store 118. Computing system 101 also comprises, in one embodiment, validation component 110. Validation component 110 is configured to, in one embodiment, determine a level of validity of local data 132. In one embodiment, determining a level of validity with validation component 110 may be based, in part, an indication of the data source. Analysis component 112 may be used to perform statistical and/or descriptive analysis on indications of local data 132, for example. Computing system 101 may further comprise data provider 116. In one embodiment, data provider 116 is configured to decompose inputs. Data provider 116 may also be configured to retrieve relevant data that is submitted to computing system 101. Other items 142 may comprise a variety of different computing components of computing system 101.

Data store 118 comprises, in one embodiment, applications 122 and other items 126. Applications 122 may be implemented by application component 108. Applications 122 may be configured to allow users 102 to perform processes and tasks for system 101. Applications 122 comprise, in one embodiment, distribution management system (DMS) 128 and application program interfaces (APIs) 130. FIG. 1 illustratively shows that, in one embodiment, data store 118 receives local data 132. Data received at and, for example, processed by data store 118 may comprise metadata 120. In addition, or alternatively, data received at data store 118 and, for example, processed by data store 118 comprises abstracted data 124. Data store 118 may be configured to receive and process these and any other suitable data forms. Communication (i.e. the transfer of data) between local data 132 and data store 118 may occur over a network or any other suitable network configuration. In one embodiment, metadata 120 comprises information that allows system 101 to map indications of data stored at local data store 118. Additionally, in one embodiment, abstracted data 124 comprises summaries, trends, and reports of indications of data stored at local data store 118.

Computing system 101 may comprise a variety of different computing systems that use data store 118. For example, and not by limitation, system 101 may comprise a data distribution system, an electronic marketplace system, a data valuation system, and/or a digital data marketplace. In one embodiment, computing system 101 utilizes data store 118 to provide a data distribution platform. System 101 may, in one embodiment, provide distributed hosting and database management for the use of local data 132 by users 102 through applications 122.

Applications 122 may comprise any suitable applications activated and facilitated by system 101 to perform one or more functions. In one embodiment, applications 122 comprise Exchange Management System (EMS) 128. In one embodiment, EMS 128 is configured to map multiple autonomous database systems to computing system 101. In one embodiment, EMS 128 comprises a database management system (DBMS). In another embodiment, EMS 128 comprises a type of multi-DBMS. EMS 128 may also be configured to allow the definition, creation, querying, updating, and administration of one or more databases. In one embodiment, computing system 101 is capable of decomposing a query that is received through data provider 116. The system may decompose said query into subqueries, which may be submitted to the autonomous database systems. In one embodiment, system 110 is configured to receive a weather product generation input with data provider 116. For instance, the query comprises a factual question regarding the forecast for Minneapolis, Minn. EMS 128 may thus be configured to decompose and submit the query to various databases.

These various databases may collectively store at least a portion of local data 132. However, individual database systems may employ a variety of query languages and structures. Each individual database system may have different database models, query processing, and transaction processing. In addition, traditional distributed database systems that compile and collect a large amount of data can become complex and require increased transactional processing capabilities. This may both affect the confidentiality of the data obtained from multiple data sources, and require more powerful processing capabilities in order to maintain consistency and integrity of local data.

At least some embodiments herein are configured to reduce privacy-related issues, and reduce the amount of processing required to distribute valued data items. In one embodiment, computing system 101 is configured to use data virtualization as a data management tool. For instance, system 101 is configured to allow applications 122 (i.e. EMS 128) to retrieve and manipulate data from the autonomous databases. System 101 may also be configured to retrieve and manipulate the data from the databases without requiring certain technical details regarding that data (i.e. by retrieving or generating an indication). In one embodiment, system 101 comprises an electronic marketplace that deploys a platform supported by a distributed virtual database system (DVDS). A DVDS, in one embodiment, comprises multiple databases that are in communication over network 150. Further, in one embodiment, the DVDS comprises a virtualization of the multiple databases in communication with one another. For example, and not by limitation, EMS 128 comprises a collection of the data indications provided by the various, autonomous databases. Such a structure may allow a user to access data store 118 to view, manage, create, read, and update local data 132. As such, the DVDS structure of system 101 may enable multiple database systems, either centralized or distributed (or both centralized and distributed, in one embodiment), to be accessed on demand. This allows users 102 to view collections of data published by multiple database systems by pooling server resources. The data may be accessed in real-time and/or stored for later retrieval.

In one embodiment, applications 122 comprise one or more application programming interfaces 130 (APIs). APIs 130 may comprise, for example, Distribution Program Interfaces (DPIs). DPIs may be configured to not only provide user 102 access to data store 118 and applications 122, but also provide the functionality for user 102 to program and modify other applications and databases. In one embodiment, APIs 130 are configured to provide users 102 the ability to create, modify, and update, for instance, programs that define how the system performs distribution operations. For example, and not by limitation, users 102 may use APIs to generate applications that automatically specify which data 132 will be published to data store 118, and therefore which data will be available for use in end-user products. For instance, DPIs may generate distributable results in response to queries or product requests that are received by data provider 116 (i.e. a query for radar weather images of Portland, Oreg.).

Applications 122 may generally provide end-user applications that are utilized by data consuming computing system 123. For instance, applications 122 provide the functionality to generate consumer products that include validated or otherwise analyzed data contributions. As such, system 101 is configured to provide the end-users with a product that provides a plurality of data subsets related to a product query.

As mentioned above, system 101 may also comprise, in one embodiment, data provider 116. Data provider 116 may receive a query to search local data 132. In one embodiment, data provider 116 indexes local data 132 to provide indications of the query results to data store 118. In one embodiment, data provider 116 identifies a stored data contribution (e.g. local data 132 that is published to a data store). The query result indications may be used by system 101 to generate metadata 120 and/or abstracted data 124, in one embodiment. Further, computing system 101 may comprise analysis component 112. Analysis component 112 may be configured to perform statistical analyses and/or descriptive analyses on indications of local data 132 (e.g. metadata 120 and abstracted data 124). Statistical analyses may, in one embodiment, infer properties about the obtained data and use modeling, machine learning, and data mining to analyze the current and historical data. Analysis component 112 may also be configured to perform a variety of additional analysis functions. System 101 may also comprise validation component 110. In one embodiment, validation component 110 comprises a validation engine. Validation component 110 may be configured to, in one embodiment, identify source information of local data indications. Validation component 110 may also be configured to determine a level of validity of local data 132, based in part on the identified source, for example. System 101 may thus determine the validity of local data 132 based on, for example, the credibility of the published data source, the frequency of data contributions by the source, and the historical accuracy of data contributions by the data source.

Figure 2:
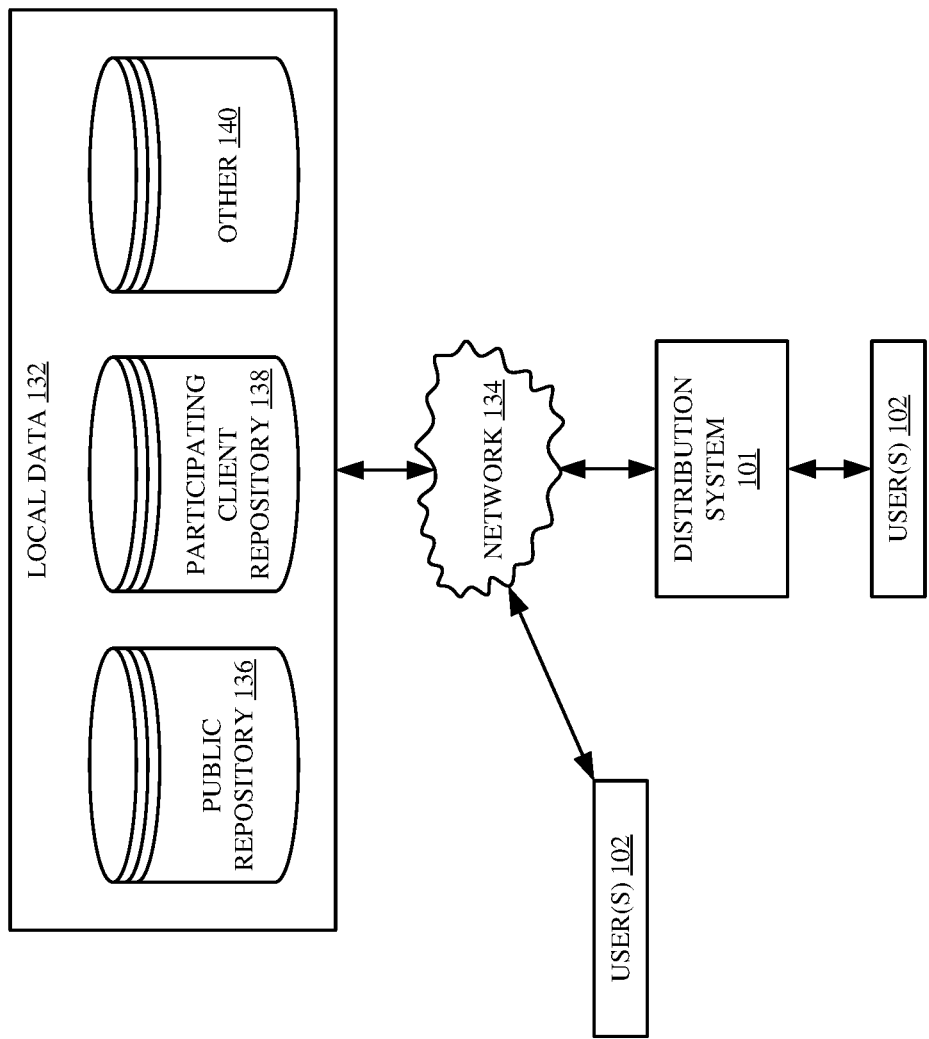
FIG. 2 is a block diagram of one embodiment of a data distribution environment.

FIG. 2 is a block diagram of one embodiment of a data distribution environment. As illustrated in FIG. 2, local data 132 is provided to computing system 101 via network 134. Network 134 communicatively couples local data 132 with computing system 101 and users 102. Network 134 may comprise, for example but not by limitation, a wide area network (WAN), a local area network (LAN), an Internet area network (IAN), the Internet of Things (IoT) or any other suitable network configuration. For example, in an embodiment where network 134 comprises the IoT, the IoT may include a variety of different sensors and client devices that collect data for an initial envisaged purpose. In one embodiment, network 134 provides the necessary resources for accessing local data 132 in a manner that is consistent with distributed hosting and distributed data management.

FIG. 2 also shows that local data 132 may comprise public repository 136, participating client repository 138, and other repositories 140. As discussed above, computing system 101 may enable collection of data from multiple autonomous database systems, such as repositories 136-140. Repositories 136-140 may be centralized database systems. In addition, or alternatively, repositories 136-140 may be distributed database systems. In one embodiment, repositories 136-140 compile and collect data from a variety of disparate data sources. For instance, public repository 136 collects data from data sources that publish data to the repository based on a public data policy. Public repository 136 comprises, in one embodiment, one or more database systems that are managed and operated by public organizations and government services. For example, a database system with information from the National Weather Service is a public repository. Participating client repository 138 comprises, in one embodiment, one or more database systems that collect and organize data from a variety of participating client sources. For example, a participating client source is a client device associated with a user that has agreed to publish data. Other repositories 140 may comprise various centralized and distributed database systems.

In one embodiment, system 101 is configured to deploy a hybrid cloud architecture that allows for configuration of data acquisition. Data acquisition preferences may include a range of local acquisition and disparate acquisition preferences. In one embodiment, system 101 may allow user 102 to create and modify acquisition preferences. This may substantially increase the efficiency of data collection and improve the quality of data retrieved. In other words, system 101 may, by user 102 input or automatically (i.e. based on market need as defined by user 102 in API 130), modify which public data source (or repository) will be utilized. In one embodiment, system 101 is configured to allow user 102 to set acquisition preferences based on the desired distribution product. Where system 101 uses published data to generate a product that is specific to a geographical location, data acquisition may be focused on data sources identified as being proximate that location. For example, and not by limitation, system 101 generates a weather exchange product. The weather exchange product may receive a request to generate temperature reports, for example, for Minneapolis, Minn. In one embodiment, system 101 guides the exchange of distributable resources toward that geographical location.

In one embodiment, system 101 guides an exchange by altering acquisition preferences based on the geographical identifier in, for example, a query input. The system may identify published local data that has been tagged as, for example, being published or initially recorded in Minneapolis. For instance, the system identifies temperature data from temperature sensors on mobile phones located in Minneapolis. This may be, in one embodiment, in response to a query input requesting forecast information (e.g. weather data) regarding Minneapolis, Minn. The system may identify mobile devices that are also subscribed to publish weather data to a public repository. Rather than acquiring a large amount of temperature sensor data that, although published for use with the system, is identified as being recorded in a city other than Minneapolis. Similarly, in one embodiment, an administrator for a company may use system 101 to generate an energy usage report for each office in a building. The administrator may set data acquisition preferences. The preferences may instruct the system to search and retrieve published data that is identified as being associated with, for instance, the company, the employees, or the geographical location of each office within the building, etc.

Alternatively, a distributable product may require a high resolution of data that relies on a large number of time series. For instance, system 101 may generate a distributable product that requires many data points. As an example, system 101 may be configured to generate a transportation product that uses traffic information for highways across several states. In such a scenario, system 101 may, by user preference or by automatic configuration, shift data acquisition to a hybrid or more cloud-based acquisition. This may broaden data acquisition to disparate data sources and/or a hybrid of disparate and local data sources.

In one embodiment, the system is configured to perform proactive adjustments of data acquisition. This may allow the system to acquire relevant data without parsing unnecessary data points or requesting information from irrelevant data sources. For example, the system determines supply and demand for local information to target data acquisition.

Figure 3:
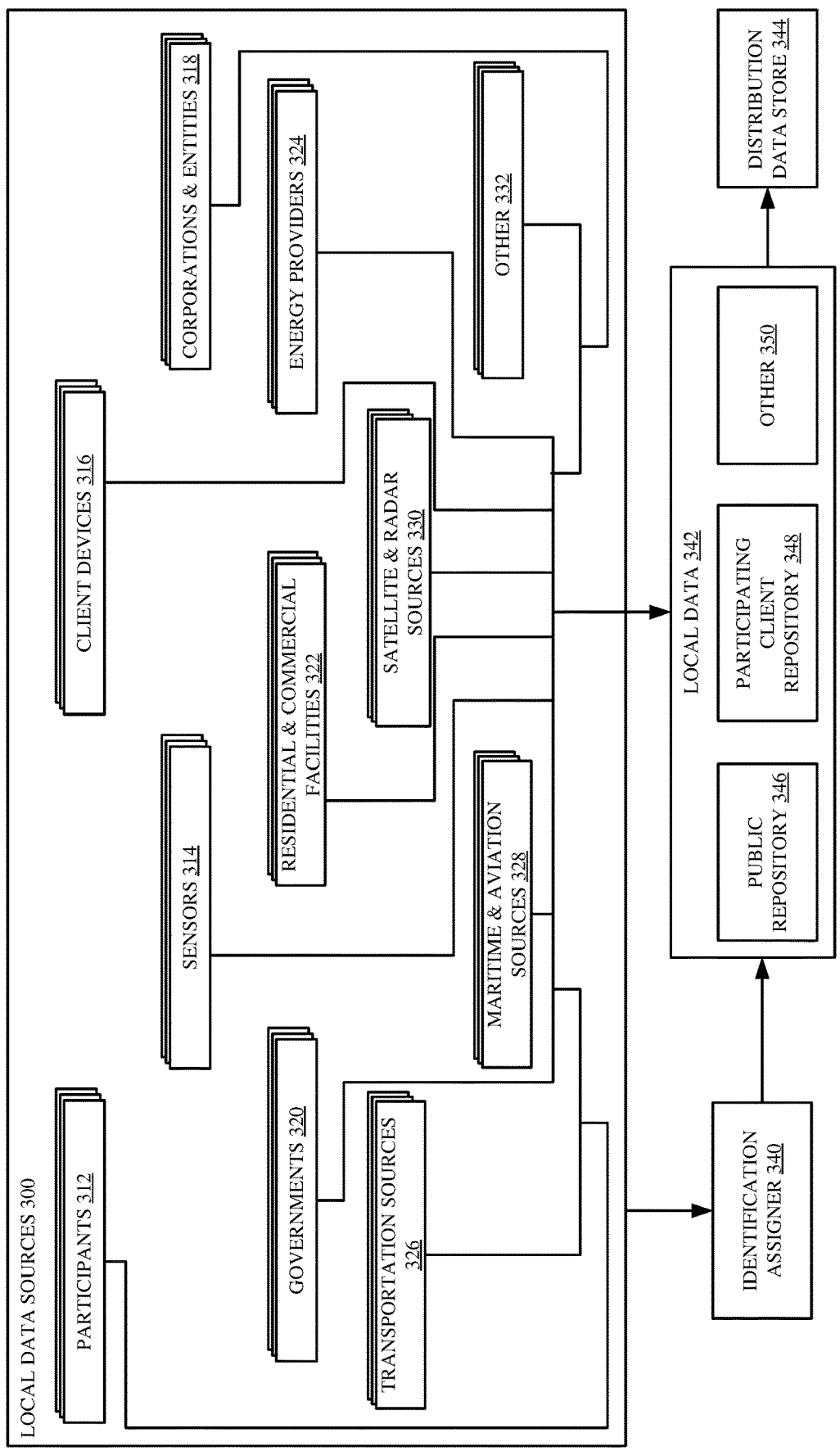
FIG. 3 is a block diagram of one embodiment of a local data source environment.

FIG. 3 is a block diagram of one embodiment of a local data source environment. Local data sources 300 comprise participants 312, sensors 314, client devices 316, corporations and entities 318, government sources 320, residential and commercial facilities 322, energy providers 324, transportation sources 326, maritime and aviation sources 328, satellite and radar sources 330, and other local data sources 332. Data sources 300 may comprise one or more centralized or distributed databases that store local data 342 in an organized manner based upon a database model. As such, FIG. 3 illustratively shows that local data sources 300 may be compiled to local data 342. Local data 342 may be organized in a database model that comprises, in one embodiment, public repositories 346, participating client repositories 348, and other repositories 350. In one embodiment, local data 342 comprises local data 132. In one embodiment, public repository 346 comprises public repository 136. In one embodiment, participating client repository 350 comprises participating client repository 138. In one embodiment, other repositories 350 comprises other repositories 140. Each repository 346-350 may comprise one or more individual data repositories specific to the data source. It is noted that while, in one embodiment, specific data sources 300 and repositories 346-350 are shown, one skilled in the art would appreciate that a variety of other sources and database storage systems may be used in compiling local data 342. In one embodiment, data sources 300 may include one or more data sources that do not contain either of a centralized or distributed database, but are rather an application or client device that has the capability of storing at least some local data for access by, for example, system 101. FIG. 3 further shows that, in one embodiment, local data 342 may be provided to data store 118, for example, which is a distribution database of a weather data distribution platform.

In one embodiment, participants 312 have subscribed to publish local data 342 to participating client repository 348. The published data may be obtained for validation, analysis, and use in distribution system 101. Participating client repository 348 may be a local data storage repository. In one embodiment, repository 348 is local to participant 312 or a distributed repository distal to participant 312. For example, client repository 348 may be local RAM storage on a mobile device (i.e. client device 316). In another embodiment repository 138 is a remote data storage repository. For instance, repository 348 comprises a remote server storage configuration. Regardless of the type of local data storage, access to local data 342 may be provided by querying a distribution system through a data provider to obtain an indication of the data (e.g. metadata 120 and/or abstracted data 124) for subsequent storage in a data store.

FIG. 3 also illustratively shows that a distribution system may comprise identification assigner 340. Local data sources 300 comprise, in one embodiment, a variety of sources with differing content and complexity. While system 101, in one embodiment, provides anonymity in data publishing to protect personal data privacy, it may provide exchangeable value based on analysis and validation of published data. To achieve this, local data 342 may be applied a unique identification by identification assigner 340 so system 101 may properly track the data throughout use by, for example, applications 122.

To further discuss embodiments of identification assigner 340, a system 101 will be described with respect to one embodiment of data collection for residential and commercial facilities 322. However, the system may be configured for a variety of contexts (e.g. weather). In one embodiment, residential and commercial facilities 322 are connected through an Internet of Things network. Facilities 322 publish a variety of different sensor and process management data to local data 342. Published data may be assigned a unique identifier by identification assigner 340 as the system, in one embodiment, removes original source identifiers when parsing data to a data store (i.e. by generating metadata and abstracted data, which may also protect privacy). In this way, assigner 340 may aid in maintaining a source identifier for the published data in the system. In one embodiment, assigner 340 may assign an identifier based on the embedded computing system of local data 342. For example, assigner 340 may assign an identifier that indicates the IP address facilities 322. A variety of other source identifications may be used. In certain embodiments, participants 312 register processes specific applications, and/or individual devices with computing system 101. As such, the registered processes, and devices may each be assigned a unique identification. For instance, assigner 340 determines a user identifier that uniquely identifies a user. The user identifier may be associated with participant 312. This user identification may comprise, for example, a user identification for the data distribution system, an email verification account, a client device identifier, etc.

In one embodiment of the present disclosure, local data sources 300 comprise systems, subsystems, and various devices that provide different types of information to a computing system. These various systems and subsystems, along with the various devices and registered processes and applications, may be compiled to form local data 342. In one embodiment, the compiled local data comprises original data from local data sources 300. In another embodiment, local data 342 comprises an indication of the original data from local data sources 300. In such an embodiment, the indication is, for instance, based on both the query data request and the unique identifier as assigned by identification assigner 340. Whether local data 342 comprises the original data from local data source 300 or an indication of the local data may depend on the type of local data source 300, in one embodiment. As such, several examples of local data sources 300 will be discussed in further detail below.

Residential and commercial facilities 322 may comprise, in one embodiment, heating, ventilation, and air conditioning (HVAC) control systems with programmable controllers. The programmable controllers may support a direct digital control program code for programming time schedules, set points, controllers, logic, timers, trend logs, and alarms, for example. In one embodiment, the direct digital control program code may provide data to local data 342 for use with the computing system. In another embodiment, residential and commercial facilities 342 may include home automation, smart meters, connected thermostats, lighting, and shades, for example.

In one embodiment, maritime and aviation sources 328 may have marine energy management (MEM) systems that include energy systems such as propulsion, auxiliary engine, refrigeration, and HVAC, for example. These systems and their processes may provide both original data and data indications to local data 342. In one embodiment, transportation source 326 may include onboard diagnostics (OBD) systems that provide access to the status of various vehicle subsystems. Transportation sources 326 may also comprise road weather information systems (RWIS) that provide access to sensors that measure atmospheric and pavement conditions, along with participation and cloud coverage conditions. As such, transportation sources 326 may provide both OBD and road weather information data to the computing system.

Local data sources 300 further comprise, in one embodiment, satellite and radar sources 330. Satellite and radar sources 330 comprise, in one embodiment, a variety of systems and subsystems that transmit signals in response to a received signal. In one embodiment, satellite and radar sources 330 comprise a transponder that provides information to local data 342.

Corporation and entities 318 along with government local data sources 320 may comprise, in one embodiment, systems and subsystems with a variety of different data sources. In one embodiment, corporations and entities 318 comprise a variety of disparate client devices and sensors associated with facilities and personnel of the corporation or entity. In addition, in one embodiment, government sources 320 comprise facilities and service providers such as the National Weather Service.

Similarly, other sources 332 may provide published data to a computing system. Other data sources 332 may comprise, for example, weather forecasts and observations that provide weather data that is already determined to be accurate and valid, based largely on the identification of the data source. One example of a reliable weather data source is the metrological assimilation data ingest system (MADIS) that collects weather related data from a variety of different disparate data sources. For example, the MADIS may be connected through a network to various satellite and radars 330 and sensors 314. In another embodiment, other sources 332 comprise weather forecasting and observations from weather stations, airports, individual observers, and permanent weather observation stations that obtain reliable weather data.

Client devices 316 may, in one embodiment, comprise mobile devices, mobile device management systems (MDMS), mobile device applications, and mobile device storage, which may each provide published data and data indications to computing system 101. MDMS may include, for example, over the air distribution of applications along with data and configuration settings for all types of mobile devices including mobile phones, smart phones, tablets, computers, ruggedized mobile computers, mobile printers, mobile point of sale devices (POS), field devices, field device communicators, cars, vehicle transportation systems, etc. Mobile device applications may be installed or deployed on various client devices 316, in one embodiment. Mobile applications may be configured to access the installed device systems that may provide sensor information, diagnostics, captured images, video, and cached data, for example. A distribution system may be configured to obtain such data stored in applications local to client devices 316.

Local data sources 300 may also comprise, in one embodiment, energy providers 324. Energy providers may also provide local data 342 to computing system 101. Energy providers 324 may comprise energy providing entities such as local power plants and heating and ventilation systems, along with their associated processes, devices, and sensors, and energy management software. Energy management software may include energy-related software applications that provide, for example, utility bill tracking, real time consumption metering, HVAC and lighting control systems, building simulation and modeling, carbon and sustainability reporting, IT equipment management, demand response, and energy audits. The operation of an environment in distributing value assigned data as provided by energy providers 324 will be further discussed with respect to FIGS. 7A-7B.

Local data sources 300 may comprise any combination of sources 312-332. In one embodiment, systems, subsystems, and devices act independently. In an alternative embodiment, local data sources are configured to function as a collaborative system.

Figure 4A:
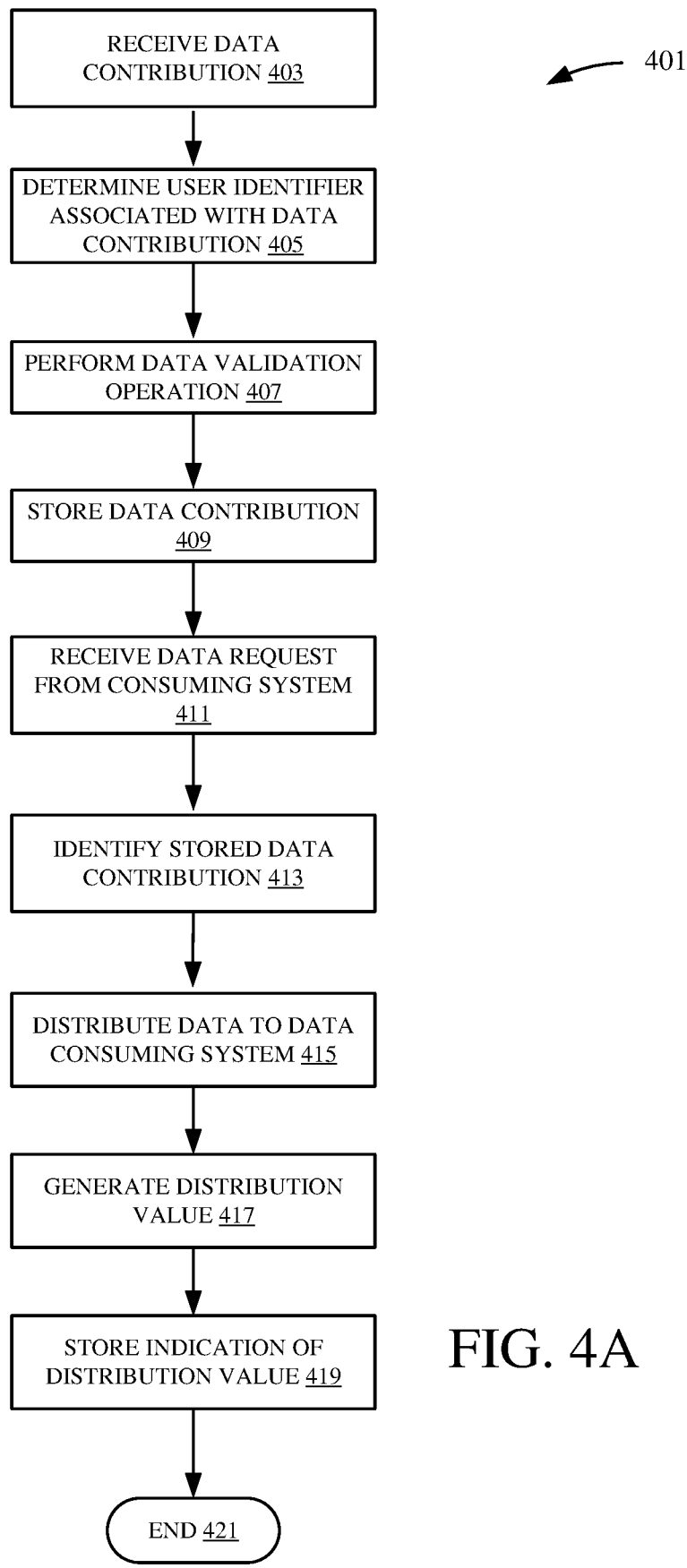
FIG. 4A shows a flow diagram illustrating one embodiment of the operation of a weather distribution environment.

FIG. 4A shows a flow diagram illustrating one embodiment of the operation of a data distribution environment. For sake of illustration, but not by limitation, method 400 will be described in the context of architecture 100.

Method 400 illustratively includes receiving a data contribution. This is generally shown at block 403. In one embodiment, receiving a data contribution comprises receiving local data 132 provided by data publisher 103. For instance, user 111 is subscribed to data distribution system 101. User 111 has thus agreed to publish data obtained at a client device 109 associated with the user. As such, the system receives a data contribution. In one embodiment, data provider 116 is configured to receive the data contribution.

It is shown at block 405 that the system determines a user identifier associated with the data contribution. Determining a user identifier may be accomplished in a variety of ways. In one embodiment, data provider 116 is configured to determine the user identifier. In an embodiment where the data contribution does not have an associated user identifier, identification assigner 340 may generate and thus determine the user identifier.

Block 407 generally indicates that system 101 performs a data validation operation. In one embodiment, validation component 110 performs a validation operation to validate the data contribution. The validation operation may be based on a variety of metrics relative to the data contribution. In one embodiment, the validation operation validates the data contribution based on metrics relative to the user identifier.

Block 409 generally indicates that system 101 stores, in one embodiment, the data contribution. For instance, system 101 stores the data contribution if the system has determined that the data contribution is valid. The system may be able to efficiently store local data 132, for example, based on the local data being obtained from a data source (e.g. user 103) that has been determined to be valid.

Block 411 generally indicates that system 101 may receive a data request from a consuming system. In one embodiment, data consuming computing system 123 is configured to receive a query input from user 102. The query input may be indicative of an end-user product. As such, in one embodiment, system 101 decomposes the query as a request for a specific type, for instance, of local data 132.

Block 413 of method 401 generally indicates that the system identifies stored data contributions. Based on the data request, for instance, the system identifies local data 132 that is stored in a data store (e.g. data store 118). In one embodiment, the system is configured to identify data from data store 118, such that the identified data is both validated and relevant to the received data request.

At block 415, method 401 includes distributing data to a consuming system. In one embodiment, the data is provided to consuming computing system 123. For instance, the data contributions that have been identified as valid and relevant to the data request are distributed to the consuming system. In one embodiment, distributing the data requests to consuming system 123 comprises providing the data requests to one or more consumer products that utilize the verified data.

At block 417, method 401 comprises generates distribution value. In one embodiment, system 101 is configured to determine a distribution value is for each data contribution that is provided to consuming computing system 123. Block 417 may include, in one embodiment, calculating a distribution value for the data contribution based on a frequency or duration of use of that contribution in the consuming system (e.g. in generating an end-user product that uses the contribution).

At block 419, method 401 stores an indication of the distribution value. For instance, the system generates a distribution value and stores an indication of the distribution value in data store 118. The distribution value may also or alternatively be stored at a variety of other storage locations. In one embodiment, system 101 is configured to associate the unique identifier with the generated data distribution value. For instance, system 101 stores the distribution value by mapping the value to the publisher of the data. As such, a user or client device that has published the data contribution may ultimately be provided the distribution value, based on the mapped association provided by storing the indication of the value. At block 421, it is generally shown that method 401 may end.

Figure 4B:
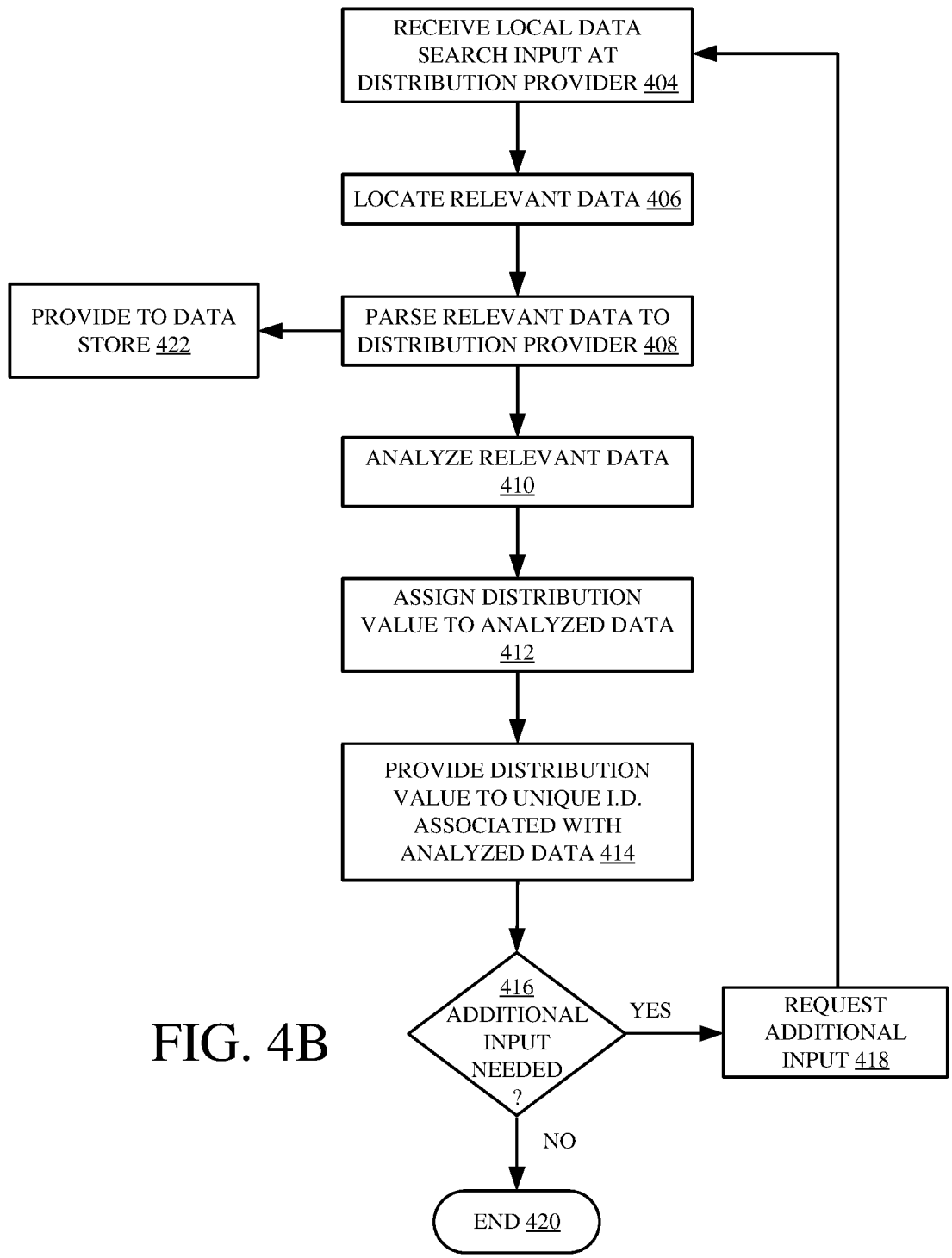
FIG. 4B shows a flow diagram illustrating one embodiment of an overview of the operation of an environment in distributing value assigned data.

FIG. 4B shows a flow diagram illustrating one embodiment of an overview of the operation of an environment in distributing value assigned data. For example, method 400 illustrates one embodiment of a computing system performing a data distribution service.

Method 400 illustratively comprises publishing local data to local data storage. This is generally indicated by block 402. Local data sources may collect data at their respective locations. Local data sources may also publish the collected data to centralized or distributed data storage repositories. Publishing of local data places the data in easily accessible and manageable repositories, thereby allowing the system to quickly search the autonomous databases in response to a search input.

At block 404, a computing system is configured to receive a local data search input. In one embodiment, a data provider receives a search input indicative of a distribution result. A data provider is configured, in one embodiment, to receive a natural language processing query including logical statements. The logical statements may indicate a request for factual answers to factual questions. Various other types of searches may be used with a data provider to locate relevant local data. For example, and not by limitation, a data provider receives a query from a user located in Minneapolis, Minn., where the user is using a mobile device to query the data distribution system (e.g. computing system 101) for the current temperature in Minneapolis (i.e. a distribution result). In one embodiment, a user provides search parameters to the system through user interface component and API, where the API comprises a data distribution provider.

The system may also be configured to locate data published to local data storage, based on, in one embodiment, the search input and the unique identifiers associated with the data. Locating relevant data is generally indicated by block 406 in FIG. 4B. Locating relevant data based on the search terms may comprise, in one embodiment, analyzing the query for natural language processing and syntax related to the search input. The system may be configured to use, in one embodiment, the unique identifier, as assigned by an identification assigner, to identify a source that the published data is obtained from. For example, the unique identifier indicates that a data source is a government weather service, a satellite with a transponder for communicating weather, or a participant that has a historical record of contributing weather related information. Thus, the system may determine that these unique identifiers are relevant to the query input regarding the temperature in Minneapolis.

Block 408 generally indicates that the system may parse relevant data to a distribution provider. In one embodiment, parsing the relevant data comprises providing the data to a data store. This is generally shown by block 422. In one embodiment, a data store comprises a distribution data store where the parsed relevant data is an indication of metadata, abstracted data, or a combination of both metadata and abstracted data, in one embodiment. Parsing the relevant data may also comprise creating an original copy of local data in the data store.

The computing system may be also configured to analyze relevant data. This is generally indicated by block 410. Briefly, in one embodiment, the system performs statistical, descriptive, and multi-parameter analyses on the relevant data. Based on the analyzed relevant data, the computing system may be configured to assign a distribution value to the analyzed data. This is generally indicated by block 412. The distribution value assigned by the computing system may be indicative of the quality, quantity, accuracy, and validity of the analyzed data. The distribution value may also be based on a user consumption level. For example, particular published information that is utilized more frequently by the system (e.g. data that is distributed more frequently, data that is utilized more often in a particular API 130) may be assigned a higher distribution value than information that is used less frequently. In addition, information published to the computing system that is more accurate than other information published to the system may be assigned a higher distribution value.

In one embodiment, the system may also be configured to provide the distribution value to the unique identification associated with the analyzed data. This is generally indicated by block 414 in FIG. 4B. As such, the system may provide the distribution value to the local data source that published the data. For example, participants may be provided an indication that information published to the distribution database is being exchanged for distribution value. In one embodiment, the system utilizes a blockchain ledger configuration in the distributed database to continuously record distribution value assignments. One example of a block ledger is a chain that tracks how a distributable value is assigned for from source to source, during a data exchange as a service.

Method 400 also comprises, in one embodiment, block 416. Block 416 illustratively shows that the system may determine whether or not an additional search input is required to generate the distribution result. Additional search inputs may be useful to increase the accuracy and validity of the analyzed data and provide additional context to the analyzed data that aides in understanding the distribution result. In an embodiment where weather data relevant to the current temperature in Minneapolis is obtained, the analyzed data may conclude that the temperature in Minneapolis has decreased 10 degrees Fahrenheit in the last hour. In one embodiment, where a local data search comprises a query for information in addition to the local temperature, those additional data parameters may be obtained to provide that information. For instance, a query includes a broader request for a weather forecast for Minneapolis, such as "what's the forecast for Minneapolis?". In one embodiment, an analysis component determines that data that is only relative to the current temperature may not provide a satisfactory distribution result that answers the factual question. The system may therefore request additional weather-related parameter(s). An additional parameter, such as cloud coverage in Minneapolis, may indicate that the temperature has dropped 10 degrees Fahrenheit in the last hour due to their being a significant increase in cloud coverage. Requesting an additional input is generally indicated by block 418. As such, the system may revert to block 406 in order to locate additional data that is relevant to the search input and unique identifiers.

Method 400 may also end when it determines that additional parameters are required to provide an accurate and valid distribution result, in one embodiment. Method 400 illustratively ends at block 420. Thus, FIG. 4B generally shows an overview of one embodiment of a method for distributing value assigned data.

Figure 5A:
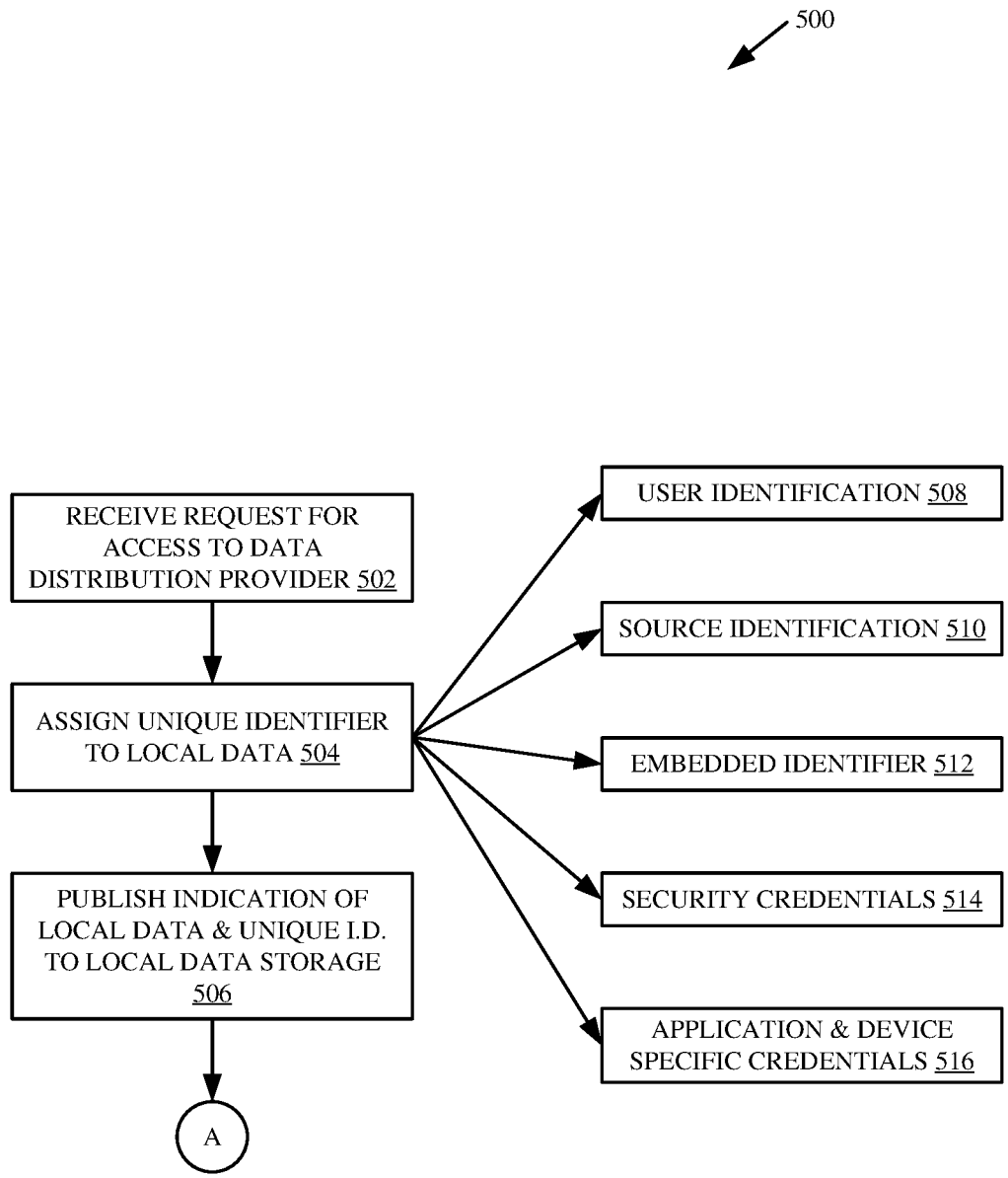
FIGS. 5A-5C show a flow diagram illustrating one embodiment of the operation an environment in distributing value assigned data.
Figure 5B:
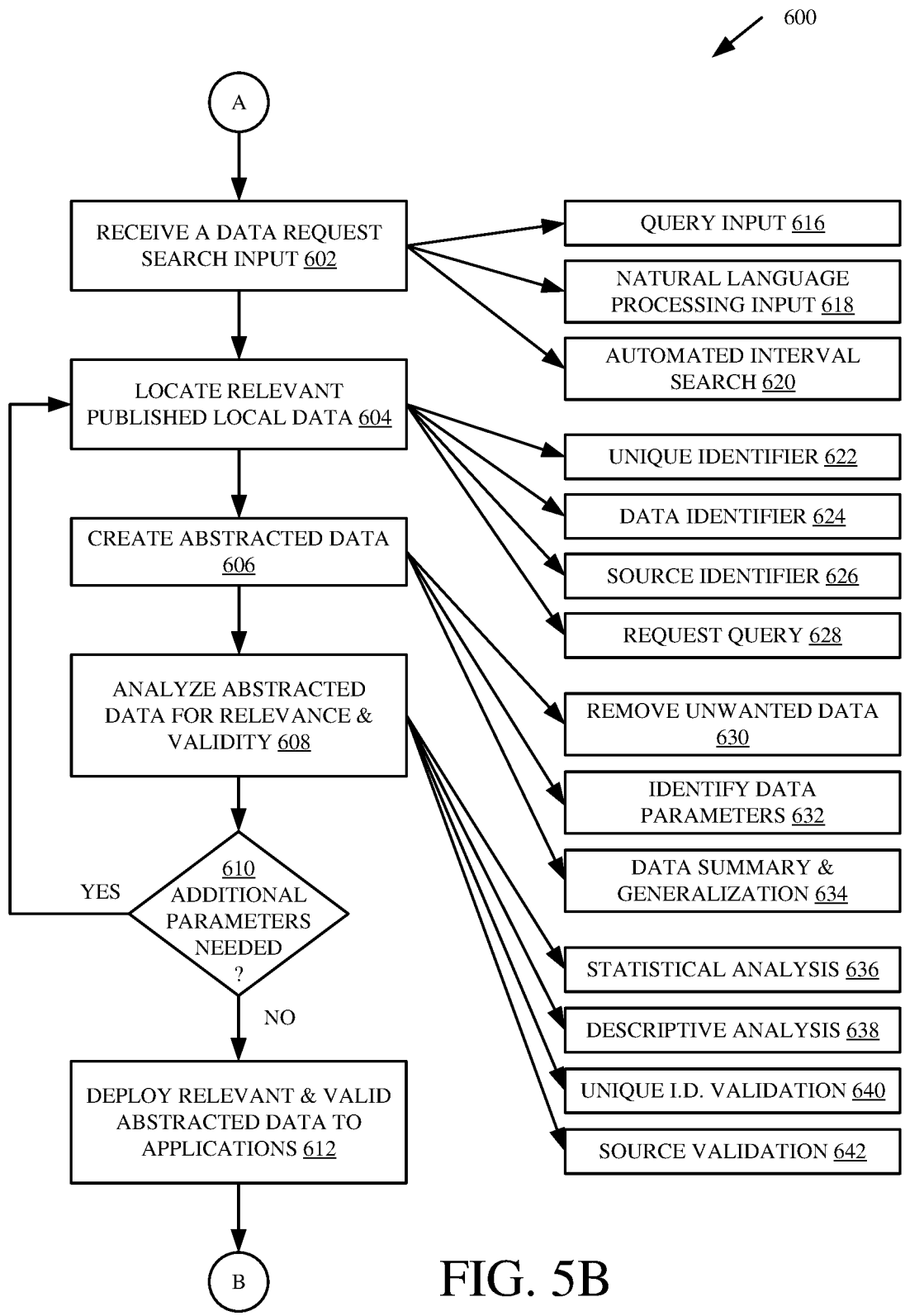
Figure 5C:
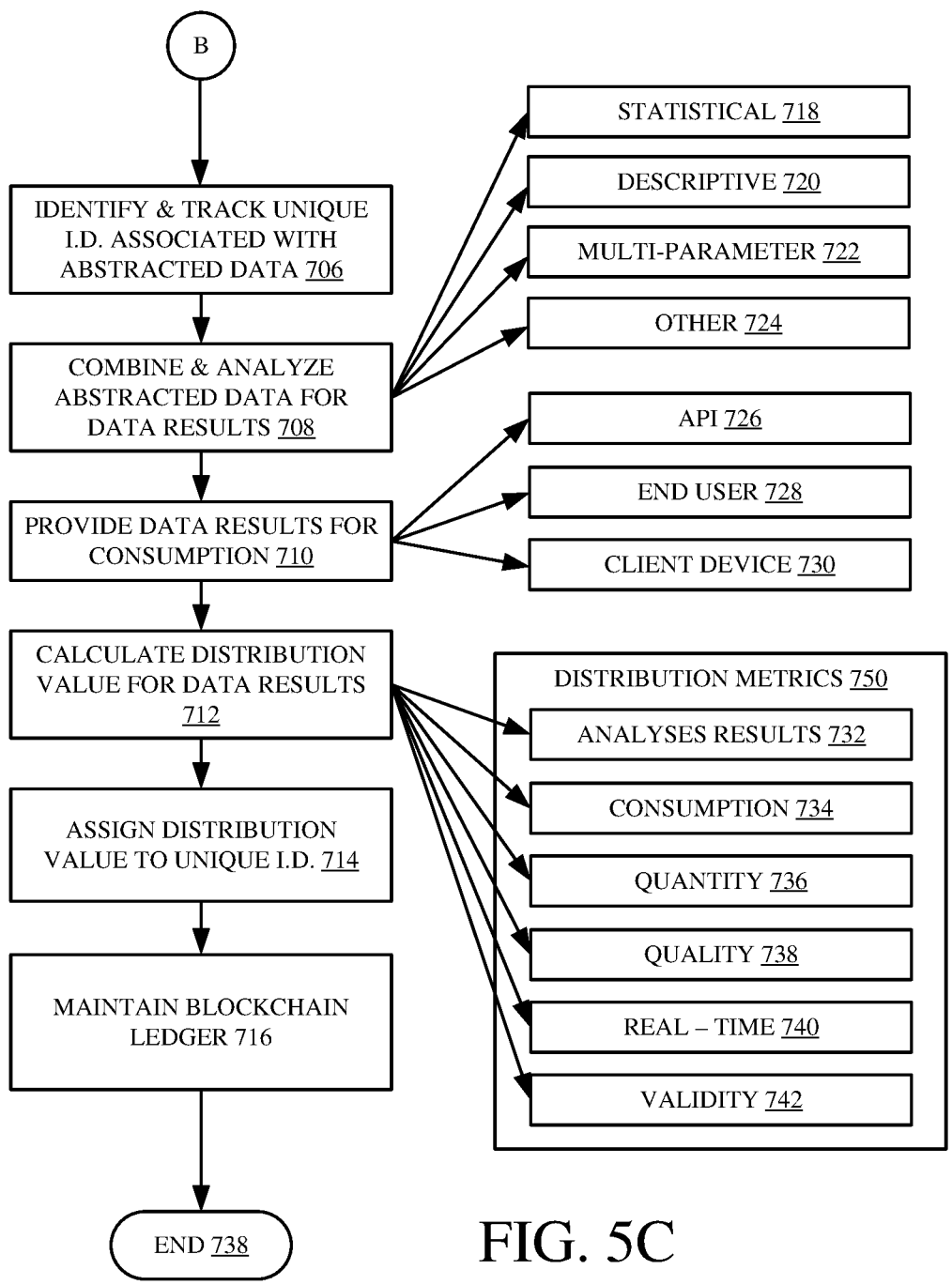

FIGS. 5A-5C show a flow diagram illustrating one embodiment of a method of distributing value assigned data. Method 500 comprises receiving an access request at data a distribution provider (i.e. computing system 101), as indicated in block 502. In one embodiment, a system provides subscription services in order to create an index of sources that are willing to contribute local data. The system may use APIs to present local data sources with enrollment options. For example, but not by limitation, the system may present a participant with a graphical user interface (e.g. user interface component of API 130 such as a dialog box, notification window, etc.) that allows the participant to subscribe to the data distribution provider. In one embodiment, a user is a programmer that manually sends requests or defines automatic request intervals to be presented to local data sources. In another embodiment, users are end users utilizing the search functionality of an API to obtain distribution results. A data provider may receive, for example, a query from a user located in Minneapolis, Minn., where said user is using a mobile device to query the distribution system for the current temperature in Minneapolis. Upon receipt of the request, the system may prompt the user to register client devices (i.e. mobile devices associated with user 102) with the distribution platform. In another embodiment, the system automatically registers a user upon receipt of the search input form said user.

At block 504, the system is configured to assign a unique identifier with an identification assigner. In one embodiment, the unique identifier is assigned to the local data. The unique identifier may comprise, in one embodiment, a variety of different identifications including, but not limited to: user identification 508, source identification 510, embedded identification 512, security credentials 514, and application identification 516. For example, when a participant subscribes with the data distribution provider, the system may prompt the participant to input a user identification that will be assigned to the participant's data as it is published to local data. User identification 514 may comprise, in one embodiment, a user I.D name, an email verification account, a cached user history log, or any other identifier associated with the subscribed user. Source identification 510 may comprise, in one embodiment, a coordinate global positioning system (GPS) location, a corporation or entity trade name, a flight number, or any other identifier relative to the subscribed local data source.

In another embodiment, the system is configured to assign embedded system identifier 512 to subscribed local data sources. Embedded system identifier 512 may comprise, for example, but not by limitation, an IP address, a MAC address, and a security identifier (SID) specific to systems of data sources. Identification assignments may comprise a variety of security credentials 514, and application and device specific credentials 516 such as a device fingerprint, SID, globally unique identifier (GUI), universally unique identifier (UUID) and object identifier (OID). Any of user, local data source, and the system itself, in one embodiment, may set the security 514 and application specific credentials 516. Regardless of the type of identification, assigning a unique identifier to the local data as it is published to local data storage may allow, in one embodiment, later retrieval, collection, analysis, and validation of that data based in part on the identification. Assigning a unique identifier to the local data may greatly increase the reliability of the distribution as data is obtained from many different local data sources. Assigning a unique identifier may also allow the system to use indications of local data rather than complete copies, thereby allowing the system to maintain a degree of anonymity and privacy for the subscribed sources.

When a unique identifier has been assigned, or in an embodiment where no unique identifier is required, devices, applications and processes associated with local data sources may publish to local data. This is generally shown by block 506. In one embodiment, the subscription provides enrollment options that allow user 102 to specify which devices, applications, and processes may publish data for use in system 101. In one embodiment, data sources do not have a direct user input, and may be configured to automatically publish data to the data distribution provider. For example, residential and commercial facilities may have a governing data policy that does not require a user to confirm or deny enrollment for publishing data to the system.

Publishing to local data (such as local data 132) may comprise, in one embodiment, publishing data to a local data storage such as participating client repository 140. In one embodiment, the computing system stores the original data at the local data storage. In yet another embodiment, the computing system stores an indication of the local data at the local data storage. The indication of the local data may comprise, but is not limited to: an indication of the storage location at any or all of a relational data repository, an operational data store, a master database, structured and unstructured data sources, external relational or structured sources, internal and external sources of unstructured and semi-structured information, real time sources such as external data feeds, and internal sources such application informational technology infrastructure event monitoring. In one embodiment, storing an indication of local data provides expedited search input processing, as the system is not required to sift through unnecessary bits of information. In one embodiment, the indication stored at local data storage (i.e. local storage 136-140) comprises at least a portion of a unique identifier assigned by an identification assigner. Once the local data or the indication of the local data is published and stored at the local data storage, the data is ready to be searched and parsed to the system for analysis. As such, the computing system obtains, in one embodiment, an indication of local data as it was originally published to local data storage. This allows the computing system to obtain a variety of different data from a variety of different sources while providing fast and reliable data retrieval.

FIG. 5B illustrates one embodiment of a method 600 of obtaining published local data and analyzing the data for deployment to applications. As mentioned above with respect to a computing system (such as system 101) may receive a data request search input. This is generally indicated by block 602. In one embodiment, block 602 comprises any or all of the features discussed with respect to block 411 of FIG. 4A. Receiving a data request may also or alternatively occur before or after receiving a data contribution or validating the data contribution. The data request input may comprise, in one embodiment, any of a query input 616, a natural language processing input 618, automated interval searches 620, or any other suitable input through an input mechanism. In one embodiment, a computing system is configured to automatically request local data from local data sources at regularly scheduled intervals as defined by a user. Thus, a data store may be configured to receive data from local data sources at regularly defined intervals. The system may also be configured to receive various other kinds of automated data interval searches 620 to obtain relevant local data, in one embodiment.

At block 604, in one embodiment, the system locates relevant published data, based on the search input. In one embodiment, locating relevant data comprises any or all of the features discussed with respect to block 403 in FIG. 4A. Locating the published data that is relevant to the search input may be accomplished using a variety of data identifications comprising any of, but not limited to: unique identifier 622, data identifier 624, source identifier 626, and prior query results 628. Unique identifier 622 may comprise any of the unique identifiers 514-522 assigned by unique identification assigner 340. In one embodiment, locating a unique identifier (e.g. block 622) comprises any or all of the features discussed with respect to block 405 in FIG. 4A.

In one embodiment, a data identifier of the system is configured to identify information details included in the local data. This is generally indicated by block 626. For example, in response to receiving a "temperature" search input, a data provider may detect a unit (e.g. Fahrenheit) symbol in the published local data indication. In another embodiment, locating an indication of the relevant local data may comprise detecting a source identifier. Source identifier 626 may comprise an identification that is relative to the local data source as assigned by an assigner. For example, corporation and entities may comprise source identifier 626 that identifies the trade name of the corporation. Thus, when a query is received that includes a request for energy performance statistics related to "Target Corporation Headquarters," a data provider may detect source identifiers associated with Target headquarters in Minneapolis, Minn. The system may also include a data provider that, in one embodiment, utilizes prior query results 628 to identify relevant local data. For example, but not by limitation, a system previously carried out a local data search that produced a distribution result in response to the logical query, "what is the current precipitation on Interstate 94 near Minneapolis, Minn.?" The system, upon a similar search input being received, may locate published local data that was identified by the system as being relevant to the previous search and results. The computing system may, in one embodiment, use a combination of unique identifiers applied by an identification assigner, data identifiers that are inherent to the information contained in local data, and previous query requests to locate indications of relevant local data. Thus, the system may provide increased reliability and decrease the time required to obtain relevant local data by providing various data identification parameters used by data provider 116.

In one embodiment, the system utilizes a proactive adjustment of data acquisition to locate and ultimately parse the relevant data to a data store. The system may analyze the supply and demand of local information to determine data acquisition rates. For example, and not by limitation, the system comprises a roadway condition application used by commercial trucking operations. Local data sources for such an application may comprise individual trucks that travel on highways. The trucks may comprise onboard diagnostic systems that include, for instance, an infrared (IR) temperature sensor. An operator of the truck may opt-in to publishing of temperature sensor information in return for a distribution value. In one embodiment, the distribution value provided back to the subscribed user comprises a high-resolution navigation map with road temperature conditions. As such, the system may be configured to acquire local data that is particularly relevant to the local users that are requesting such information (e.g. the truck driver that has subscribed to the platform). For instance, the system automatically determines that a storm occurrence (e.g. a winter weather advisory notification provided by the National Weather Service) is issued for the vicinity of the determined location of truck. The system may proactively adjust data acquisition to increase the resolution (e.g. frequency) of data points to more accurately provide road temperature information for the surrounding storm area to the driver. Alternatively, for example, where no storms notifications exist for a vicinity of the truck, data acquisition may be reduced as there is a decreased demand for road temperature information. As such, the system may dynamically determine which local data sources are most relevant to generate a distributable product.

Further, for example, the system may increase data acquisition based on location mapping. For instance, when the truck is approaching a bridge, an area of roadways that is prone to freezing conditions, the system increases data acquisition rates while in a vicinity of the bridge. In addition, the system may generally increase data acquisition when the system receives local information indicating that the temperature is below freezing.

In another embodiment, the system is configured to generate a tornado prediction application. The tornado prediction application may use local weather data in a prediction index to provide accurate tornado prediction mapping. In one embodiment, the system proactively adjusts weather data acquisition to acquire relevant weather data. For instance, where a notification of a tornado warning is identified, the system increases data acquisition of local weather sources within, for example, a defined proximity of that warning. As such, when no tornado warnings are identified, then the system decreases data acquisition to limit unnecessary bandwidth consumption.

In addition, method 600 comprises, in one embodiment, creating abstracted data from local data. This is generally indicated by block 606 in FIG. 5B. In one embodiment, the system is configured to collect both abstracted data and metadata from local data. As such, a data store may include a data repository that comprises either, or both metadata and abstracted data. A data store may include, in one embodiment, a partitioned database having a metadata repository and an abstracted data repository or a combination of both. For the purpose of illustration, block 606 comprises creating both abstracted data and metadata. As such, block 606 comprises converting the local data to abstracted data and metadata, in one embodiment.

Metadata 120 may comprise, in one embodiment, information for a data provider and application component that allows the present system to map local data storage. Thus, the application component may include a metadata manager that is configured to detect relationships between sets of data from a variety of different databases (i.e. the autonomous data repositories 136-140) from which local data is obtained. An application component provides the functionality and implementations that allow a user interact with data at a data store, in one embodiment. In one embodiment, a database management system provides a user with the ability to view, track, organize, and delete the obtained local data, in part based on the relationships identified by metadata. Because autonomous data repositories may include different query, tree, and node structures, a data store utilizes metadata to create a universal data form for mapping local data. In one embodiment, metadata comprises indications relative to the data parameters of the data request query. Metadata may also or alternatively comprise information that indicates any or all of the following: what the data is, what the data shows relative to the request, and where the data is obtained from. For instance, metadata may comprise a parsed version of local data that indicates that the temperature in Minneapolis is obtained from a sensor, positioned on a device on top of a particular building in Minneapolis. Metadata may comprise, in some embodiments, quantitative and qualitative data relative to the query of the local data, and thus identify data parameters.

Generating abstracted data and metadata may further comprise removing unwanted data, in one embodiment, which is generally indicated by block 630. Thus, a data store may comprise a parsed version of local data that does not include any potentially compromising personal information of a user or other data source. In addition to removing unwanted data, in one embodiment, creating abstracted data and/or metadata comprises generating data summary and generalizations, as generally indicated by block 634. As such, abstracted data includes summaries, trends, and reports, whose use with a distribution system will be discussed in further detail below with respect to data analysis and FIG. 5C.

Method 600 further comprises analyzing abstracted data for relevance and validity, as generally indicated by block 608. In one embodiment, analyzing abstracted data comprises any or all of the features discussed with respect to block 407 in FIG. 4A. Analyzing the abstracted data may comprise performing both statistical analyses 636 and descriptive analyses 638. Analyzing abstracted data may also comprise either or both of unique identification validation 640 and source validation 642. While block 608 is generally directed to analyses performed on abstracted data, as obtained from local data, the system may also be configured to, in one embodiment perform higher-level analyses on data or data indications provided to applications. Referring back to block 608 of FIG. 5B, statistical analyses 636 may infer properties about abstracted data through the use of modeling, machine learning, and data mining that analyzes the current and historical data to capture valuable relationships among many variables. The system may use, in one embodiment, a validation component and an analysis component to perform descriptive and statistical analyses. Analyzing abstracted data may also comprise performing a unique identification validation 640 and source validation 642. In one embodiment, performing unique identification validation 640 comprises providing a scoring and reliability valuation against the unique identifiers 514-522 associated with abstracted data. In one embodiment, the system analyzes abstracted data obtained from government data sources to determine that the government sources include a unique identification that indicates the government source is a reliable and accurate source for providing data in response to the query.

At block 610, in one embodiment, the system may determine whether or not additional parameters are needed to satisfy the query and provide a distribution result. If the system determines that additional parameters are needed the system may revert to block 604. At block 604, further indications of relevant local data are located. However, in one embodiment, if an analysis component determines that no additional parameters are needed, to fulfill the data request, method 600 proceeds with block 612. In one embodiment, the system deploys a hybrid cloud architecture with configurable preferences for data acquisition. In an embodiment where the system determines that additional data parameters are needed, the system may shift data acquisition to trend data locally or disparately. For example, and not by limitation, a car (e.g. transportation source 326) traveling on a highway obtains a variety data from sensors and OBDs to continuously update visibility and road traction conditions. Typically, the car systems will locally maintain the obtained data. However, where the distribution system determines that there is a storm warning (e.g. as determined by data published by a weather provider), the system may push relevant data to a hybrid cloud storage. As such, the system may be configured to, in one embodiment, determine whether additional parameters are needed and perform the necessary data acquisition processes to ensure that there is telemetry by the relevant sources to obtain those parameters.

Block 612 illustratively shows providing relevant and valid abstracted data to the data distribution platform. In one embodiment, providing relevant and valid abstracted data to the data distribution platform comprises providing the abstracted data to applications. More specifically, but not by limitation, providing data to applications (e.g. applications 122) comprises providing the data in intuitive interfaces to a user through APIs (e.g. DPIs 130). As such, method 600 illustratively comprises processing a data request query to locate relevant data at disparate local data sources, creating an abstract of the relevant local data and analyzing the abstract for relevance and validity utilizing the abstracted data by providing the data to the data distribution platform and the applications wherein the applications will provide the abstracted data to a user.

FIG. 5C depicts a flow diagram illustrating one embodiment of a method 700 for assigning a value to distributed data. At block 706, the system may be configured to identify and track unique identifications associated with abstracted data. Identifying and tracking the unique identifier may allow applications and thus a user to determine how the data is used throughout system and by other users in the end product. In one embodiment, data provider 116 is configured to determine a user identifier that uniquely identifies the user.

In one embodiment, the system is configured to combine and analyze abstracted data in order to produce data distribution results. This is generally indicated by block 708. Abstracted and analyzed local data may be combined by the system, in one embodiment, to perform any of further: statistical 718, descriptive 720, and multi-parameter 722 analyses. Other analyses 724 may also be performed on the abstracted data to obtain the data distribution results. As such, the system may collect hybrid data, which comprises, in one embodiment, a combination of structured (e.g., numbers, categories, etc.) and unstructured data (e.g., videos, images, sounds, text, etc.) to provide comprehensive data results for consumption.

Providing data results for consumption is generally indicated by block 710. In one embodiment, this step comprises any or all of the features discussed with respect to block 415 in FIG. 4A. The system may be configured to, in one embodiment, provide results to end users and client devices via APIs. This is generally shown by blocks 726-730. In one embodiment, once the data results have been combined and analyzed to produce a data distribution result, the results are provided to a user through an API. One advantage of some embodiments discussed herein is the ability for users to create, manage, and deploy their own APIs that are specific to a type of data collection. For example, the system allows a user to create an API that provides real-time and high definition weather radar and satellite images to other users and their associated client devices (e.g. participants 312 and client devices 316, energy providers 324 and sensors 314).

In addition, method 700 illustratively comprises calculating a distribution value for the data results. This is generally indicated by block 712. In one embodiment, calculating a distribution value comprises any or all of the features discussed with respect to block 417 in FIG. Calculating a distribution value for the data results may include calculating a variety of distribution metrics 750 including, but not limited to: analysis results 732, consumption 734, quantity-based 736, quality-based 738, real time 740 and validity-based 742 metrics. The system may thus provide, in one embodiment, a way of transforming data from a variety of different sources to a distribution value based on how that data influences the results of the query. In one example, analysis results 732 may indicate that the data obtained from a local data source includes metadata that accurately responds to each and every request in the data request query. The system would thus calculate a higher distribution value. The system may also utilize consumption metrics 734, which may indicate how frequently the data results are used, or a total quantity of use relative to the data results. For instance, consumption metrics 734 are indicative of how frequently or how often data contributions are used in a data consuming system. The consumption analysis may generate a consumption indication, for instance. The consumption indication can be indicative of the level of use of the data contribution in end-user products (e.g. the data consuming system). For instance, the consumption indication indicates a number of instances that the data contribution, or a subset (e.g. parsed version) of the data contribution, has been used to generate a distributable product. The distributable product may be an application generated by the consuming system and configured to use data contributions from a variety of users. Therefore, where a specific data result is consumed more frequently by end users, the system may calculate a high distribution value compared to a data result that is used less by end users.

A variety of factors may influence calculated distribution metrics 750. These factors may comprise any of: the type of local data source, the context of the data request, and the data itself. For instance, a traffic request may include a request for vehicle accidents. For such a request, the computing system may be configured to require only three confirmations of the vehicle accident from local data sources. When the first three confirmations are received and processed by the system, the distribution value will be provided to the first three local data sources, and no others. In another example, a request is received for a weather forecast. The system may be configured to receive many indications of weather variables. However, the system may only provide credits to sources that provide the first five indications of temperature and the first four indications of precipitations, for example, as received in chronological order. As such, a user, computing system, and local data sources may be able to set preferences for calculating distribution values for the data results. For example, a user may specify that only temperature sensors that provide data indications for a specific manufacturing facility will be provided credits when a request is received for energy performance for that facility. In one embodiment, the distribution value comprises credits that are redeemable for monetary value.

In block 736, a system determines a quantity of data provided. When a data source provides a high quantity of results to the system, it may calculate a high distribution value for the results. The distribution value may also be calculated based on a quality of the data results, as shown in block 738. Determining the quality of the data results may include, in one embodiment, identifying a level of accuracy when compared to other similar data results, and comparing the current data results to past performance data results and future predictions of data results. In addition, quality-based calculations 738 may rely, in one embodiment, on analysis results 732 as determined by an analysis component. Calculating the distribution value may also comprise, in one embodiment, time-based metrics 740. In one embodiment, time-based metrics 740 are based on a time differential between when the data request was submitted and when the data source provided the local data to the distribution system. As such, data is provided to the system in substantially real time in response to a data request will have a high calculated distribution value, in one embodiment. In another embodiment, real-time determination 740 may indicate that the data results were provided to the system at a time that does not indicate accurate and reliable data results. Therefore, results provided in real time may provide more valuable results to users and may thus be assigned a higher distribution value when compared to results deemed to be out of date. In one embodiment, metrics 742 may use a validation component to assign a higher distribution value to data results that are provided by valid data sources. In one embodiment, data results from invalid sources will be assigned a lesser distribution value, or no value at all.

Block 714 illustratively comprises assigning a calculated distribution value to the unique identifier associated with the data results, in one embodiment. Assigning the distribution value may comprise, in one embodiment, providing the distribution value to the unique identifier. In one embodiment, a system may be configured to provide parameters that define when the distribution value is provided to the source. In one embodiment, the calculated distribution value (i.e. credit) may be provided to the source immediately after the data is received. In another embodiment, the system may provide the distribution value once the data indication is validated. In a further embodiment, the system may provide the credit to the unique identifier in exchange for a different data result by that unique identifier. Further yet, a system may provide the credit to the unique identifier once the distribution value is fully calculated based on distribution metrics 750. While the distribution value itself may be provided, in one embodiment, an indication of the distribution value is provided. For example, the system is configured to notify a user that a distribution value has been assigned to data provided by that user. In another embodiment, assigning the distribution value to the unique identifier comprises automatically transferring the distribution value to the user or local data sources that is associated with the unique identification. Thus, in one embodiment, a system is able to provide a variety of data sources and users with an electronic compensation that is based on a variety of metrics relating to the data source's participation and quality of data that is published from the source.

In one embodiment, a distribution system is configured to maintain a continuous record or a ledger for cross-examination and verification of the distribution value assignments. In one embodiment, the system utilizes a blockchain ledger within a data store (i.e. a distributed database). This is generally represented by block 716. In one embodiment, maintaining a blockchain ledger comprises any or all of the features discussed with respect to block 419 in FIG. 4A. The blockchain ledger may record, in one embodiment, each assignment or distribution of the calculated distribution value in a block. Each distribution value assignation, as it occurs, creates a unique chain between the various block elements, in one embodiment. Each block element may comprise unique signifiers that indicate each instance of the chain assignations. Therefore, each assignation of the distribution value may be uniquely identified and tracked to the sources of distribution and, ultimately, the original source of the data. As such, the system provides, in one embodiment, a value distribution system with security and tracking features that allow a user or program to ensure that compensation for local data services is accurate. The blockchain ledger configuration may also be utilized with respect to the data value calculations, as well as with the identification and tracking of unique identifiers associated with a data element or data source.

Figure 6A:
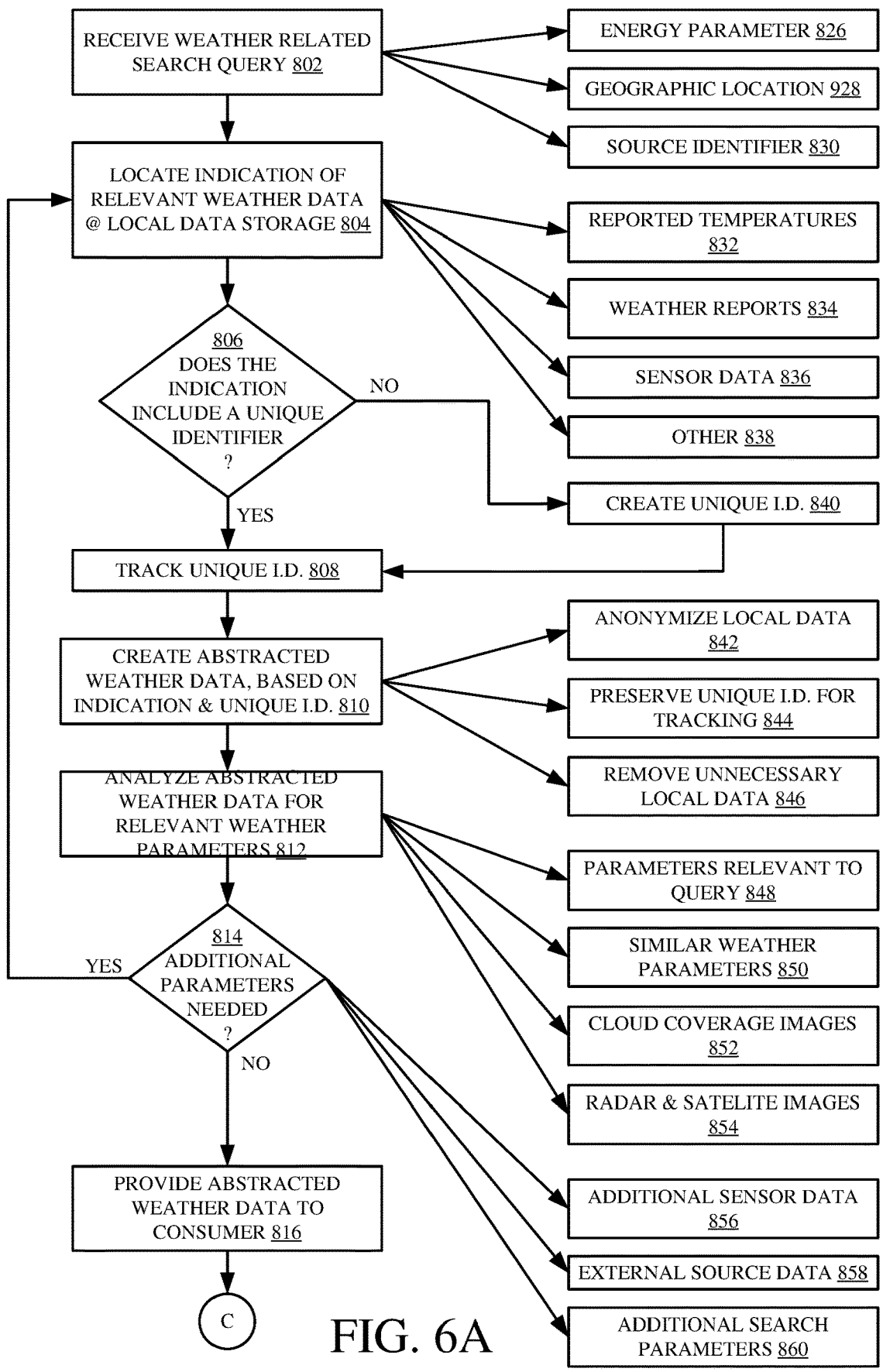
FIGS. 6A-6B show a flow diagram illustrating one embodiment of the operation of a weather environment in distributing value assigned data.
Figure 6B:
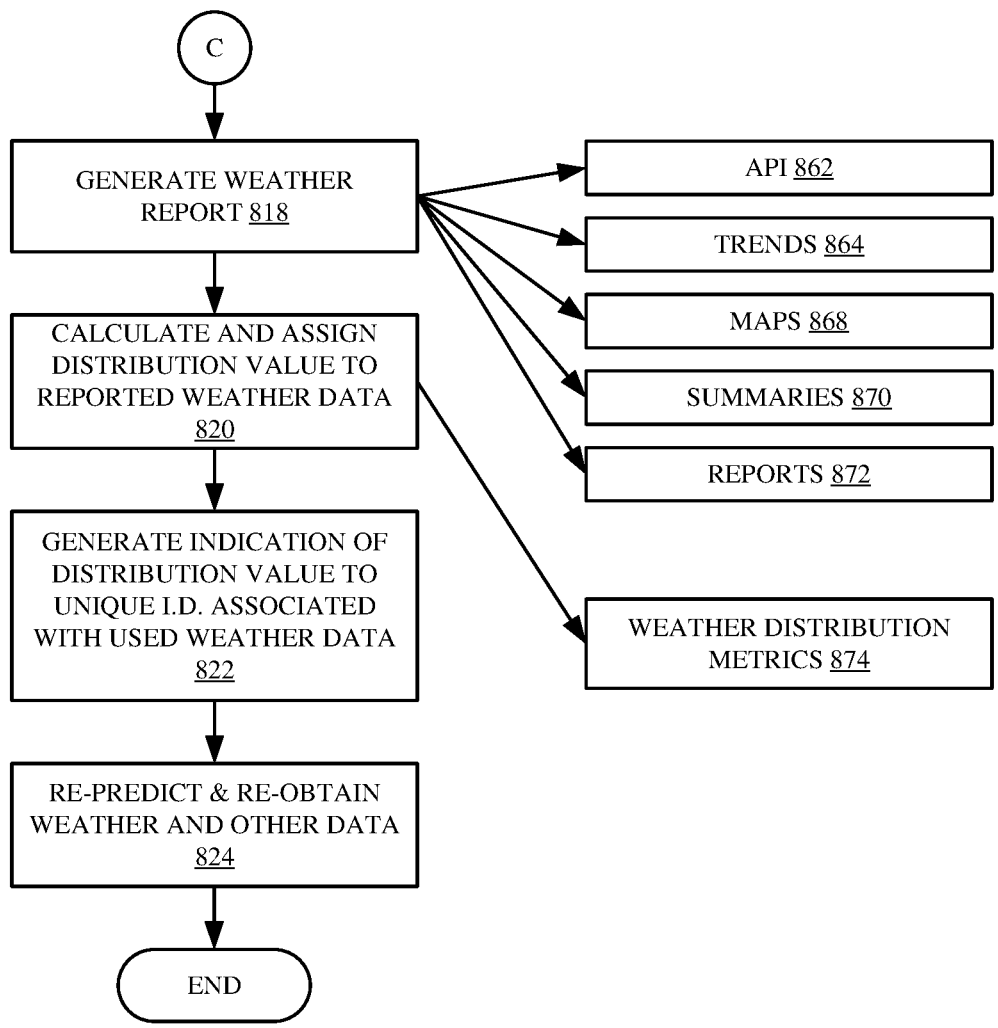

FIGS. 6A and 6B show a flow diagram of a method 800 of distributing value assigned data for weather-related services. As shown at block 802, a system may receive a data request that comprises search parameters in the query "recent cloud coverage in Minneapolis." The search parameter received at block 802 may comprise any of a weather parameter 826, a geographic location 828, and a source identifier 830, in one embodiment. In one example, weather parameter 826 comprises a weather parameter request 826 for "cloud coverage." In one example, while the geographic location 828 comprises "Minneapolis, Minn." The system may use a data provider to parse the received query input to locate a source identifier 830. For example, but not by limitation, a source identifier 830 may comprise an indication that the user would like to obtain local data results from a specific source. For example, a user may indicate a preference for cloud coverage data from the National Weather Service (e.g. government source 320). It is noted that a variety of other queries may also be used with the system.

Block 804 illustratively comprises locating an indication of local weather data relevant to the query. This may comprise searching local data for an indication of reported temperatures 832, weather reports 834 (i.e. severe weather reports), sensor data 836, and other weather related data 838 in, for example, Minneapolis.

At block 806, the system determines, in one embodiment, whether the weather data indication comprises a unique identifier. In one embodiment, a unique identifier may be a variety of different identifications that are associated with local data sources. If the weather data indication does not include a unique identifier, the system may use an identification assigner to create a unique identifier, as indicated by block 840. Where the weather data indication comprises a unique identifier, in one embodiment, the system tracks the unique identifier, as illustrated by block 808.

In block 810 a distribution system, in one embodiment, creates abstracted data based on the weather data indication and unique identifier. Creating abstracted weather data may comprise, in one embodiment, any or all of: anonymizing local data 842, preserving the unique identification for tracking 844, and removing any data indications that are unnecessary to the query and requested product 846. In one embodiment, the system may obtain weather indications that include image files from a mobile device (i.e. client device 316). The system may, in one embodiment, be configured to remove any indications associated with the image that might point to an individual's privacy, and remove any data associated with the image that is not relevant to providing the distribution result—the recent cloud coverage in Minneapolis. In one embodiment, the system removes any portions of the image file that impede the ability to analyze the image for cloud coverage. In one embodiment, the system may also remove portions of the file that do not pertain to tracking the source. For example, if the image file includes contact information for user or a depiction of the user, the system may parse the image by both removing the depiction and the embedded contact information, thereby leaving only the cloud coverage portion of the image file for analysis.

At block 812, in one embodiment, a distribution system analyzes the abstracted weather data indication. In one embodiment, this comprises any of: performing statistical, descriptive, and multi-parameter analyses. The system may perform, in one embodiment, object-based image analysis on the obtained image file to determine geometry, context and texture of cloud coverage. In addition, analyzing the abstracted weather data may comprise determining whether the data includes similar weather indications. In some embodiments, the system determines whether the image includes indications of sun visibility, precipitation, wind speed, and other parameters that are helpful in providing an accurate and reliable distribution result regarding the recent cloud coverage in Minneapolis, for example. As such, analyzing 812 may comprise, in one embodiment, performing analyses on parameters determined to be relevant to the query 848, similar weather parameters 850 (i.e. previous searches similar to the present query), cloud coverage images 852, and radar and satellite images 854.

At block 814, the system, in one embodiment, determines whether additional parameters are required. In one embodiment, based on the analyzed results, the system uses a validity component and an analysis component to determine whether additional sensor data 856, external source data 858, or an additional query input 860 is needed. In one embodiment, the system determines that the abstracted weather image data alone does not provide an accurate and reliable depiction of recent cloud coverage. As such, the system obtains, in one embodiment, additional sensor data 856. Additional sensor data 856 comprises, in one embodiment, sensor data from a mobile device (i.e. client device 316) that provided the image file. Additional sensor data 856 may comprise data from a light or proximity detector, a temperature sensor, a motion sensor, or any other sensors relevant to the submitted query, in one embodiment. This additional sensor information may provide indications as to whether the sun is visible, there is precipitation, or there are high wind speeds, for instance. External source data 858 may comprise data from local data sources that are external to the mobile device, in one embodiment. For example, external data 858 comprises data from radar and satellite sources 330. Regardless of the source of the additional data, the data may be used in conjunction with the image to provide more accurate and valid products that provide cloud coverage information. Locating further indications of relevant weather data is generally shown by block 804. The system may also, in one embodiment, determine that additional search parameters are needed. In one embodiment, a distribution system generates a search input notification and provides that notification to a user. The notification may prompt user for an additional query input. This is generally shown at block 860.

In one embodiment, block 816 illustratively shows that a distribution system may provide the abstracted weather data to a consumer. In one embodiment, providing abstracted weather data to a consumer may comprise providing the data for access, management, and manipulation through an EMS to, for example, a programmer developing a weather product with an API.

Block 818 shows one embodiment of a system generating a weather product. Weather products may comprise, in one embodiment, any of weather APIs 862, weather trends 864, maps 868, summaries 870, and reports 872 that may each provide user-friendly depictions of the determined cloud coverage.

At block 820, in one embodiment, a distribution system may calculate and assign a distribution value to the reported weather data, and thus to a data source (such as data source 300). Calculating the distribution value may comprise, in one embodiment, utilizing weather distribution metrics 874, which may include distribution metrics (such as distribution metric 750), to calculate a credit associated with the data indication. Weather metrics 874 may comprise, in one embodiment, statistical and descriptive analysis results, weather data or weather product consumption levels, quantity-based, quality-based, real time, and validity-based metrics. In one embodiment, a distribution system provides a way to transform the provided weather indications to an exchangeable form of value based on how that data influences the results of the query and the generated weather reports that are provided to consumers (i.e. users 102).

Also at block 820, in one embodiment, the system may assign the calculated distribution value (i.e. credit) to the unique identifier associated with the local data source. When the distribution value is calculated, the system may utilize factors, including any of: the chronology of the received indications (i.e. time stamps included in metadata 120), the type of data source, the context of the data request, and the data indication itself to determine distribution of the credit. Therefore, in one embodiment, a distribution system determines how and when to assign the calculated distribution value for the reported weather data. For example, where the request for cloud coverage in Minneapolis is processed, the system may initially receive and analyze hundreds or thousands of data indications from local data sources. These sources may comprise temperature sensors, precipitation sensors, weather alerts, information provided by reputable weather services, images from mobile devices that include a depiction of the sky, photosensitive sensors on transportation vehicles, among others, for example. However, the system may assign the credit to the sources that provided the first fifty cloud coverage indications, where the first fifty are determined based on the chronology of reception at a distributed database management system, for example. Alternatively, in one embodiment, the system may assign the distribution value to sources that provided virtual images (e.g. computer-rendered maps and radars). The system may allow, in one embodiment, users to set preferences for the distribution of the distribution value.

Block 822 illustratively comprises providing a notification to a data source. In one embodiment, the system provides a notification expressing the distribution value provided. The notification may comprise an indication of the assigned distribution value or the distribution currency, itself. For example, in one embodiment, the system may provide a notification to mobile device 316, and satellite and radar sources 330 to articulate that the sources are being provided the assigned distribution value in return for their participation with the data distribution platform. The notification may further comprise, in one embodiment, an indication of the analyses performed on the data, and the calculations of the analyses that resulted in the assigned value.

The system may be configured to perform various analyses on the data used in the weather product. For example, a distribution system 101 may, in one embodiment, re-obtain weather data from sources and re-predict weather data analyses to generate accurate weather products. Re-predicting and re-obtaining weather data is generally indicated by block 824. Re-prediction and re-obtaining may also comprise combining queries to provide an analysis of data from various sources.

Figure 7A:
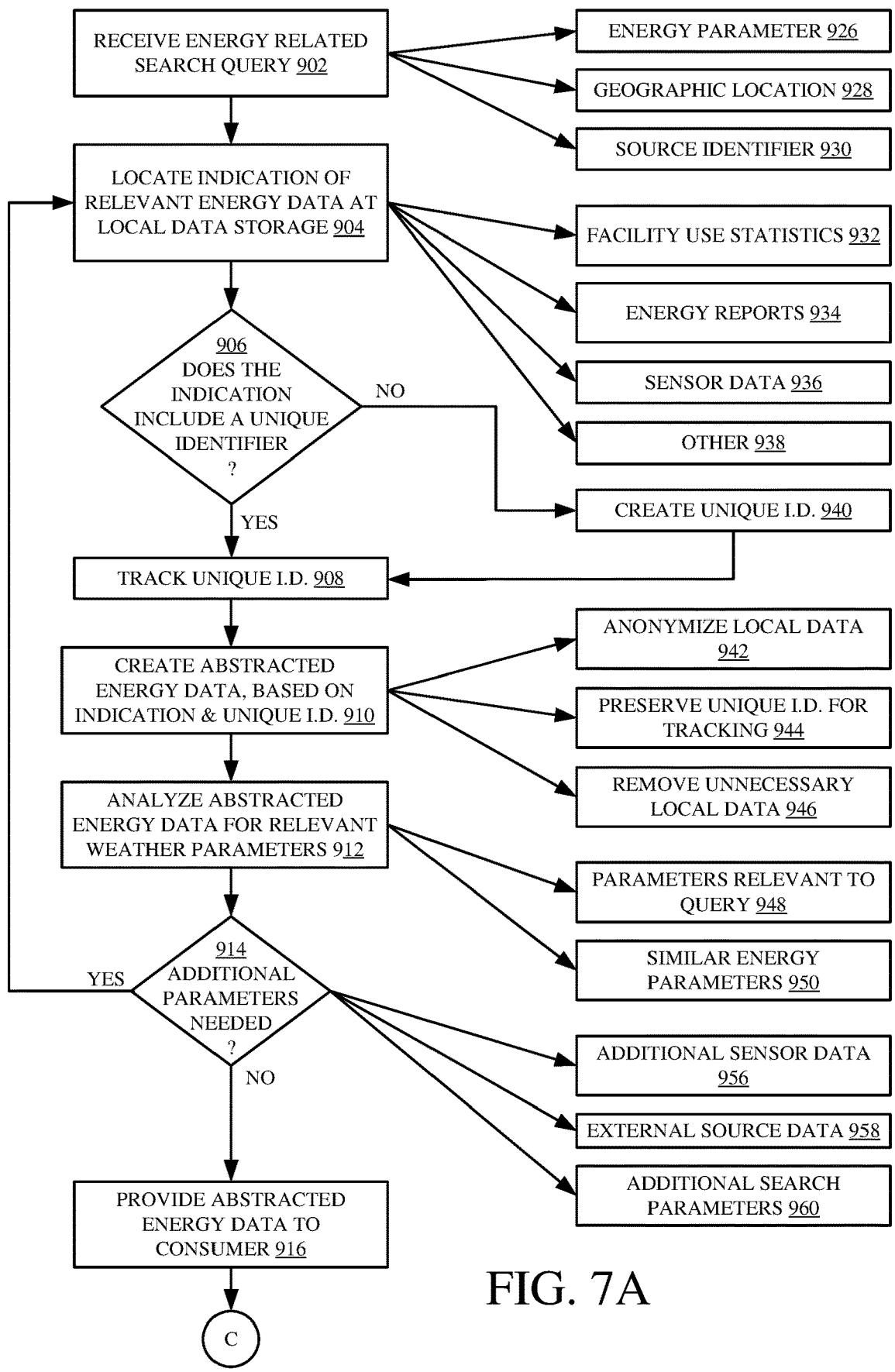
FIGS. 7A-7B show a flow diagram illustrating one embodiment of the operation of an energy environment.
Figure 7B:
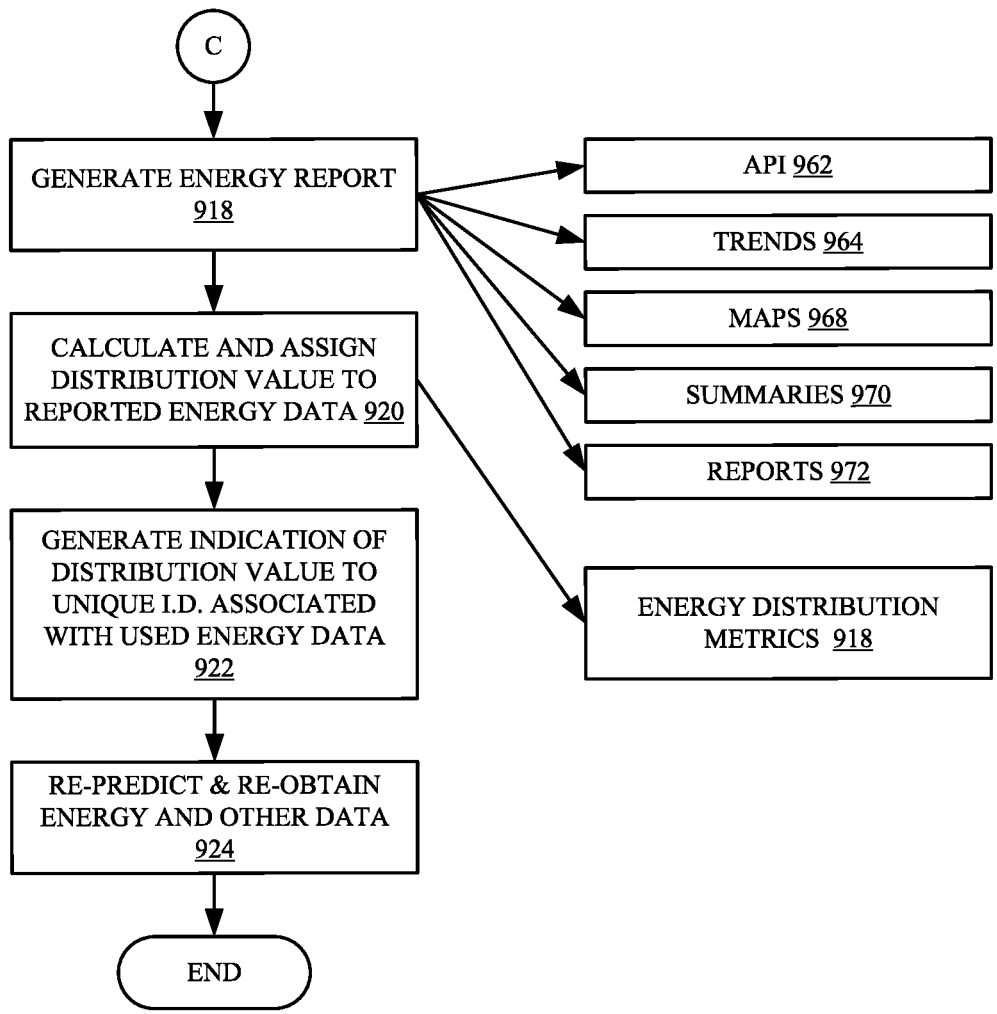

FIGS. 7A-7B show a flow diagram illustrating one embodiment of operating an energy environment. In some embodiments, a distribution system may initially perform operations with regard to a weather product query (i.e. the request for the current weather temperature in Minneapolis), and may, in one embodiment, re-predict and re-obtain further results that are indicative of a different query for an energy product (i.e. a request for energy performance of a building). In one embodiment, both queries benefit the quality of the results. For instance, the energy product may be able to provide valuable information that utilizes both outdoor temperature data and data and energy consumption data.

As such, FIGS. 7A and 7B show one embodiment of a method 900 of distributing value assigned data for energy-related services. As shown at block 902, a system may, in one embodiment, receive a data request that includes search parameters in the query, for example, "current average temperature in building B2." The search parameter received at block 922, in one embodiment, comprises energy parameter 926, a geographic location 928, and a source identifier 930, for example. In one embodiment, energy parameter 926 comprises an energy request 826, for example, for "current average temperature" while the geographic location 928 comprises "building B2." Building B2 may be a building on a college campus, a wing or section of a commercial production facility, a home or apartment, or a corporate campus, for example. Source identifier 930 may include an indication that the user would like to obtain local data results from a specific energy provider. For example, the user may indicate a preference for temperature data from a local power plant, heating and ventilation systems, along with their associated processes, devices, and sensors, and energy management software, in one embodiment (e.g. energy provider source 324).

As shown at block 904, a system may, in one embodiment, locate an indication of local energy data that is relevant to a query. In one embodiment, locating energy data comprises searching local data for an indication of facility use statistics 932, energy reports 934, sensor data 936, and/or other energy related data 938. The local energy indications (i.e. blocks 932-938) may, in one embodiment, comprise energy management software that includes any of: energy-related software applications used for utility bill tracking, real time consumption metering, HVAC and lighting control systems, building simulation and modeling, carbon and sustainability reporting, IT equipment management, demand response, and/or energy audits. These are just several examples of the various local energy indications that may be located by an energy distribution system, in one embodiment.

At block 906, in one embodiment, a system may determine whether the energy data indication comprises a unique identifier. In one embodiment, a unique identifier comprises a variety of different identifications that are associated with local data sources. If the energy data indication does not include a unique identifier, the system may use an identification assigner, in one embodiment, to create a unique identifier, as indicated by block 940. Where the energy data indication does include a unique identifier, the system may track the unique identifier, for example, as illustrated by block 908.

In one embodiment, as shown at block 910, the system creates abstracted data based on the energy data indication and unique identifier. Creating abstracted weather data may comprise any of: anonymizing local data 942, preserving the unique identification for tracking 944, and/or removing any data indications that are unnecessary to the query and requested product 946. In one embodiment, the system obtains energy indications that include sensor data from a temperature sensor from a commercial office facility (i.e. facilities 322). The system may remove any indications associated with the temperature data that might point to the corporation's private records, and remove any data that is not relevant to providing the distribution result (e.g. not relevant to the recent temperature in building B2).

At block 912, in one embodiment, the system may analyze the abstracted energy data indication. Analyzing the abstracted energy data indication comprises, in one embodiment, performing any of: statistical, descriptive, and multi-parameter analyses. In one example, and not by limitation, a distribution system may determine whether energy data includes information indicative of an average indoor temperature for building B2. In one embodiment, analyzing 912 may include performing analyses to detect past average temperatures for B2.

At block 914, in one embodiment, a processor of a distribution system determines whether additional parameters are required. For instance, based on the analyzed results, in one embodiment, the system may use a validity component and analysis component to determine whether any of: additional sensor data 856, external source data 858, and/or an additional query input 860 is needed to provide an accurate and reliable energy product result. For example, where temperature sensor data is obtained for only 75 percent of the space in building B2, the system may need additional sensor data 956. Additional sensor data 856 may comprise, in one embodiment, sensor data from mobile devices (e.g. client devices 316) inside of building B2. Additional sensor data 856 may comprise, in one embodiment, thermostat settings, air flow readings, and a variety of other sensor data relating to the interior of B2. External source data 958 may include data from sources external to the building B2. For example, external data 958 may include, in one embodiment, data from participants that indicate to the system that the interior of B2 is colder than normal (e.g. through subjective or objective submissions regarding the temperature), for example. The retrieved data may be used, in one embodiment, in conjunction with the temperature sensor data to provide more accurate and valid energy products.

In one embodiment, block 916 illustratively shows that a distribution system provides abstracted energy data to a consumer. Providing abstracted energy data to a consumer may comprise, in one embodiment, providing the data for access, management, and manipulation through an EMS. For example, in one embodiment, the data may be provided a programmer developing an energy consumption product with an API.

Block 918 illustratively shows that a system generates an energy product. Energy products may include, in one embodiment, any of: energy APIs 962, energy trends 964, energy heat or usage maps 968, summaries 970, and reports 972 of the determined average temperature readings for B2.

At block 920, in one embodiment, a distribution system calculates and assigns a distribution value to the reported energy data. Calculating the distribution value may comprise, in one embodiment, utilizing energy distribution metrics 974 to calculate a credit associated with the data indication. The system may thus provide, in one embodiment, a method of transforming the provided energy and related indications to a distributable value based on how that data influences the results of the query, and the energy products provided to consumers (i.e. users 102).

Also at block 920, in one embodiment, the system may assign the calculated distribution value (i.e. credit) to the unique identifier associated with a local data source. In one embodiment, the system may utilize factors including the chronology of the received indications (e.g., time stamps), the type of data source, the context of the data request, and the data indication itself to determine distribution of the credit. In one embodiment, the distribution system determines how and when to assign the calculated distribution value for the reported energy data. For example, the system may only assign value to the first 200 B2 temperature readings for the last 5 hours. A variety of other assignation and distribution calculations may be used for the energy indications in other embodiments.

At block 922, in one embodiment, a system provides a notification to data source. In one embodiment, the notification expresses the distribution value being provided to source in return for the energy data.

Queries for different purposes (e.g., weather and energy) may result in data with cross-applications. Referring now to the previously mentioned embodiments where a system may utilize an initial weather product query (i.e. the request for the current weather temperature in Minneapolis) in combination with results regarding an energy product (i.e. a request for energy performance of a building), both queries may benefit from the results to provide cross-query products for consumers. For example, in certain embodiments, a system receives a query from energy providers for an energy product that provides the most up-to-date lighting, heating, and cooling regiment for a building given the current weather conditions provided by the various weather sources.

A distribution system may, in one embodiment, use the query and identification information relating to both energy providers and weather sources to locate the data that the various local data sources have published to local data. The system may further determine which of the abstracted data is related to weather and which of the abstracted data is related to energy consumption. For example, an energy consumption parameter may indicate when the doors of a building have opened and when the doors of the building have closed. The system may be configured to, in one embodiment, determine any of: which rooms are in use, which rooms are empty, and/or the frequency at which the rooms are entered and exited.

In some embodiments, the energy data may be collected, compiled, and further combined with the other data obtained from weather sources. In one embodiment, the system obtains and analyzes data from weather and energy sources. In one embodiment, obtaining the data comprises receiving a single search input that identifies the request for data from both sources. In another embodiment, analyzing the data comprises determining whether additional parameters are needed (e.g. as shown at block 814). In one embodiment, the system may thus receive an additional input (e.g., block 860) to add either the weather data or the energy data to the original query.

The system may, in one embodiment, analyze both the energy and the weather data in order to produce the energy product through an API to satisfy the query. In one embodiment, the energy product may provide insight to the consumption of energy resources and how those resources relate to weather conditions at the location of energy use. For instance, the system may utilize the energy product to decrease the heat in a specific room by determining that the room has been vacant for over 30 minutes (from the sensor data from the doors). In one embodiment, the system also determines that the weather data for that location indicates that the temperature outside has increased by 20 degrees Fahrenheit over the last two hours. These analyses may indicate that the outside temperature is increasing while the building is vacant and thus energy consumption may be reduced. In one embodiment, energy consumption is reduced to conserve energy by applying less heat to the room. In a further embodiment, the system receives an indication that the door to the room has been opened and thus the room may no longer be vacant. However, simply an indication of a door opening does not necessarily indicate whether the energy product needs to determine energy level adjustments to accommodate for the door opening. A second set of parameters may be required for the system to determine whether the room will be in use for an extended period of time and thus whether it is necessary to update the energy product levels.

In block 924, in one embodiment, re-prediction and re-obtaining methods are used by the system to determine a second parameter, for example, indicating the lights in the room have been turned on for over two minutes. The indication may be published by motion sensors (e.g. sensors 314). In one embodiment, a distribution system determines that the room is being used for a long enough period of time that an update to the energy product is necessary in order to inform energy provider that a change in energy allocation is required. Thus, the system may, in one embodiment, re-collect, re-combine, and re-analyze the energy data and the weather data in order to produce an energy product.

For example, API 130 comprises a command that instructs the system to ultimately increase the temperature in the room. Moreover, each of the mobile devices 316, sensors 314, and energy providers 324 may, in one embodiment, be provided a compensation in return for their participation in the data distribution provider. This is just one example how a system collects and analyzes data from a variety of different local data sources to provide distributed hosting that allows quick access to local data in creating distribution products.

In one embodiment, system 101 is configured to perform data distribution as a cross-implementation on several data source platforms including: energy providers 324, residential and commercial facilities 322, sensors 314, client devices 316, and participants 312.

Figure 8:
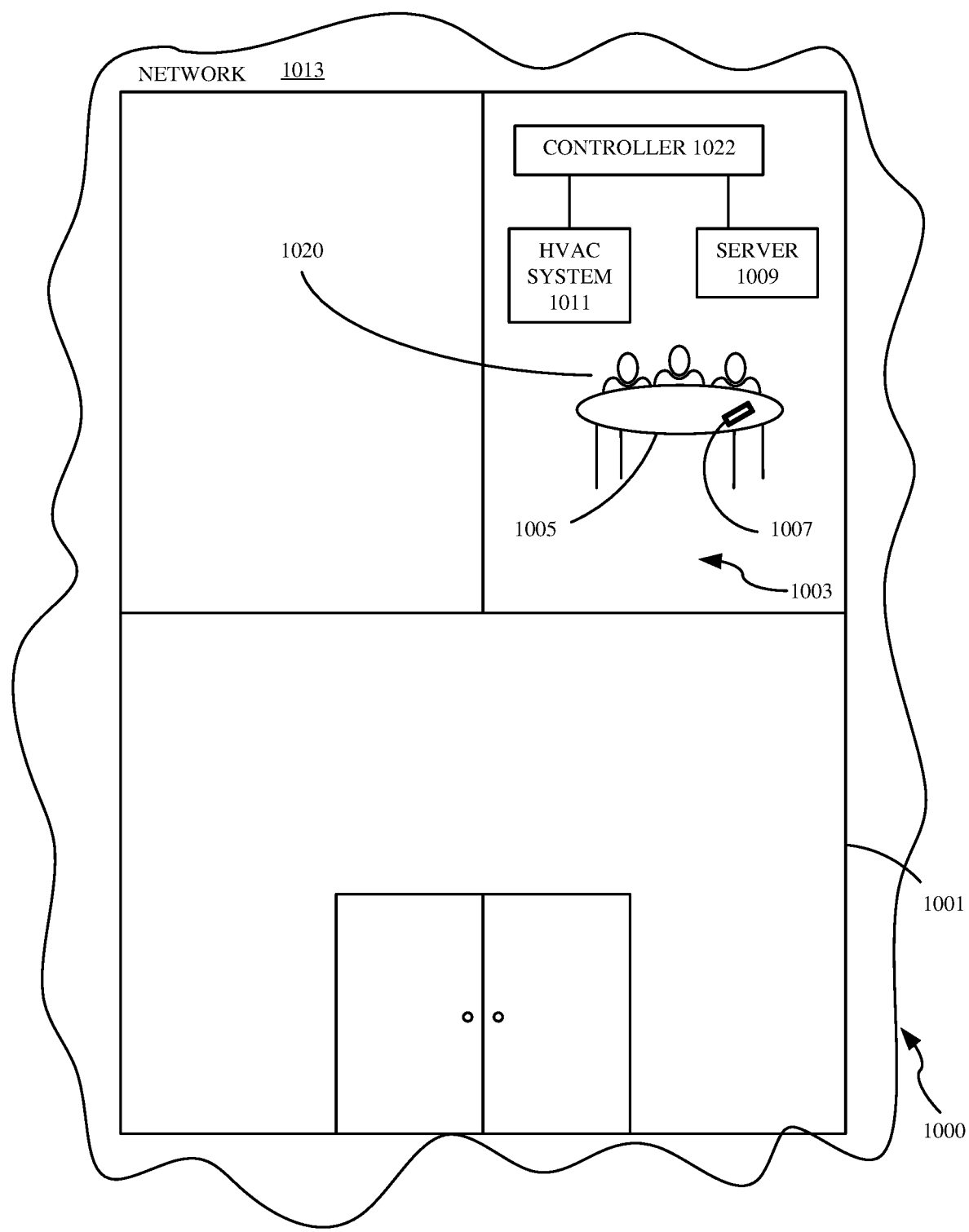
FIG. 8 illustrates one embodiment of a cross-platform distribution environment

FIG. 8 illustrates one embodiment of a cross-platform distribution environment. In the present example, a variety of data sources are in communication to perform data distribution. Such a distribution may provide cost, comfort, preference, and usability advantages. A user may, in one embodiment, set distribution preferences to achieve these advantages with, for example, a distribution API.

Environment 1000 comprises a conference room 1003 in a corporate office building 1001, in one embodiment. However, environment 1000 may also be a home, warehouse, or any other environment with potential local data sources. The corporate office building may be a part of commercial facilities 322, for example. The conference room comprises HVAC control system 1011 that manages air flow and temperature, in one embodiment. The conference room may also have any of: lighting, window blind, window opening, and window closing mechanisms, along with information technology (IT) components such as televisions, projectors and smart boards, for example. Conference room 1003 may also have a conference table 1005.

The HVAC system and its associated components, in one embodiment, is connected to energy provider systems (i.e. energy providers 324). For example, in one embodiment, they are connected to energy management software that controls real time consumption metering, HVAC and lighting control systems, and IT equipment management systems.

Conference room 1003, in one embodiment, therefore has several systems that operate locally to obtain local data (e.g. from mobile devices or sensors). These systems may also be connected to non-local energy providers, which have the capability of monitoring and throttling energy use. In one embodiment, the local and non-local systems are in communication with one another via server 1009 through the facilitation of network 1013. Network 1013 may comprise any of a WAN, LAN, IOT, or other appropriate network connection. Server 1009 and network 1013 may be, in one embodiment, any of the server and network embodiments discussed herein. Further, conference room 1003 comprises, in one embodiment, locally operating mobile device 1007 that may publish data locally and disparately. Each participant 1020 may have a mobile device 1007 (e.g. mobile device 316) that runs various applications and processes that are configured to obtain local data 132.

Environment 1000 may also comprise controller 1022. In one embodiment, controller 1022 comprises a distribution computing system (e.g. system 100). In one embodiment, participants 1020 are in a meeting conference room 1003. Controller 1022, in one embodiment, obtains published data from a mobile device that shows there is a meeting scheduled for 1:00 pm. For example, mobile device 1007 may comprise a mail client that includes a corporation calendar for scheduling meetings. Controller 1022 provides an indication of the planned meeting to both energy providers 324 and HVAC system control 1011. The energy provider and HVAC systems use the indication to configure settings for the temperature, lighting, window, window shade, and IT systems in preparation for the meeting. In one embodiment, at least some settings are selected based on past preferences from one of participants 1020.

Currently, setting preferences for each specific environments is challenging. For one, many individual rooms in residential and commercial facilities do not have thermostats or control systems specific to that room. This is because thermostats are generally expensive to manufacture and install. In addition, many systems operate individually. For example, many conventional HVAC systems currently do not utilize sensor data that is obtained from a mobile device.

Environment 1000 may be, in one embodiment, customized by users 1020 or may be automatically configured based on cost or employee comfort metrics or a combination or both. For instance, a first user may have a preference for bright lights and high temperatures. In one embodiment, this user would set those preferences accordingly. A different user may desire shades drawn and cold temperatures. This user may set environment preferences with a distribution system accordingly. Knowing such preferences may allow for controller 1011 to prepare environment 1000 in advance of the meeting.

In one embodiment, controller 1022 may determine that participant 1020 is hosting a meeting in conference room 1003 in 30 minutes. The system, in one embodiment, acquires data that may be used in performing operations on the systems. For instance, a location sensor on the participant's mobile device indicates that the device is outside of the office building 30 minutes prior to the scheduled meeting time. When the device is outside, the temperature sensor indicates the outdoor temperature is below freezing. The mobile device also indicates that it is sunny outside, based on a sensed lighting level. In addition to retrieving information from the mobile device, data published by a weather provider may indicate the current temperature is 20 degrees Fahrenheit. A calendar client may publish data that indicates the room has not been occupied for two days. Other data from the systems might indicate that the room has two walls that are primarily windows. When combined by controller 1011, such local data provides a high resolution depiction of the conditions in conference environment 1000 and experienced by participants 1020.

Based on the high resolution depiction, the system (e.g. controller 1022) may instruct HVAC systems to conform to the set environment preferences. For example, controller 1011 may indicate that windows in conference room 1003 should be shut, the window blinds raised, the ambient temperature increased by two degrees, and the overhead lights dimmed. Such instructions may be provided to the various systems (e.g. energy provider systems), and, the original source of the data may be compensated based on a variety of usage metrics.

In one example, the system optimizes data acquisition and distribution during the scheduled meeting. Participants 1020 place mobile device 1007 on the top of conference table 1005 in conference room 1003. Controller 1022 obtains temperature, lighting, and proximity sensor data published by mobile device 1007. The data may be published to the distribution system in real time and near instantaneously.

This process of obtaining and utilizing cross-platform data is possible, in part, due to the incentivized nature of the data distribution system. In the examples discussed above, energy providers, corporations, and individuals all benefit from the increased data transparency and distribution. The employees experience a higher level of comfort during the meeting, the corporation saves money by limiting energy used and increasing customer satisfaction, and the energy provider tailors its services to customers and receives detailed usage diagnostics.

The system described herein may utilize a hybrid cloud deployment that allows specific configurations for how the data is obtained, when it is obtained, what the data is obtained from, and what the data is published or distributed to. The corporation may, in one embodiment, utilize in-house servicing to have an increased portion of the data acquired be stored locally. For example, the corporation may not have an immediate use for data from smart phones that are in vehicles traveling on the highway adjacent to the building, and thus limits mobile device data to employee phones, participants who register with the system as employees, or a similar filter. Participant 1020, for instance, may also uniquely identify which data should be provided. In the current example, an employee in the meeting sets preferences that allow temperature and lighting sensor data from the mobile device to be provided to energy providers, but not to weather services. Thus, in one embodiment, the participants have the ability to filter which data is published and which remains at the collection source.

In addition to allowing the user to opt-in to providing access to data, embodiments of the present disclosure provide the ability for users to opt-in to controlling a particular asset or system (e.g. a home appliance, HVAC system, lighting, navigation system, etc.). For instance, in an embodiment where temperature sensor data is provided by a mobile device, said mobile device may also be used as a remote thermostat in either an office or residential setting. For instance, mobile device 1007 is configured to interact with HVAC system 1011 by providing thermostat functionality that may command various operations of system 1011.

As such, a distributed control system may allow authorized users to opt-in to allow control of their assets either for compensation or as part of a value added service. As such, third parties that have been authorized to access the published data may also interface and command the assets associated with the collection devices or systems (e.g. mobile phones, thermostats, etc.).

In an embodiment where an energy provider (e.g. energy provider 324) receives temperature sensor information, the energy provider may be authorized to control systems that regulate the temperature. For example, users 1020 set publication preferences that allow mobile device 1007 to publish temperature sensor information obtained at said device. An energy provider may opt-in to receive published temperature sensor data from mobile device 1007. A distributed control system, in accordance with embodiments described herein, may also allow an energy provider to adjust the temperature in environment 1000. As such, the system may be configured to allow an energy provider to regulate energy consumption based on preferences of a user (e.g. users 1020 and associated preferences for environment 1000 provided to the system). Overall, this may provide a system that reduces energy demand based on a controlled distribution of valuable information, where said valuable information would otherwise go unused.

In addition, in one embodiment, a system allows a third party (e.g. the energy provider) to provide the reduction of energy demand to the distribution system as a form of compensation. For instance, the reduction in energy demand is provided as a negawatt form of distributable value. In one embodiment, the system may utilize a block chain ledger to track which users or systems provided the temperature information that the third party found to be of value. As such, the user, facility, or residence may be provided a distributable value that is, for example, calculated based on a percentage of monetary value that the third party brokered or received in an open energy market.

In another embodiment, for example, a user does not have an HVAC control system in a personal residence. As such, the user may use a mobile device as a remote thermostat. For instance, the mobile device interfaces with a thermostat that is connected to a network. The mobile device may provide the functionality to obtain accurate temperature sensor information (along with a variety of additional information) that is specific to a location in the residence. For instance, when the user goes to bed, the user places the mobile device, which may be identified as being associated with the user, in the bedroom. The mobile device may operate as a thermostat, obtaining temperature information specific to the bedroom. An application of the system may be configured to allow the user to opt-in to publishing said temperature information from said mobile device. The application may also allow the user to set preferences regarding a level of comfort that the user will experience in the bedroom. For instance, the user is able to set preferences for a desired temperature. As an example only, and not by limitation, the user sets comfort preferences that comprise rules defining that the bedroom should be 72 degrees Fahrenheit from 9:00 pm to 6:00 am.

Not only will the mobile device be configured to publish temperature sensor information to the system, the system may provide said information to a third party that is authorized to control systems that are local to the device in order to, for instance, meet the comfort preferences. For instance, the third party uses the system to control the remote thermostat (i.e. the mobile device) to, in turn, control the local thermostat system (i.e. the thermostat connected to the network that is located in, for example, a common area of the residence that is different than the bedroom). In one embodiment, the residence includes a central thermostat in a living room, that is connected to a network. The central thermostat itself may not generate requests for heating or cooling based on the user-set preferences. Rather, in one embodiment, the mobile device generates the necessary information that defines whether heating or cooling operations are required to meet the comfort settings. As such, because the user has opted-in to third party control, the mobile device provides temperature information to the third party which may be, for example, an energy provider. The energy provider may use the temperature sensor information to ultimately control the central thermostat. For instance, the third party provides thermostat adjustment rules or instructions to the mobile device. The mobile device may then relay thermostat instructions to the central thermostat to make the necessary heating and cooling system changes. Embodiments of the system may thus comprise a demand-response system. The system may not only provide distribution values in exchange for local information, but also allow parties external to the local data source use that information to control local systems. The third parties may regulate usage in response to insights that are gleaned from the local information. For instance, the local information is indicative of a demand.

Figure 9:
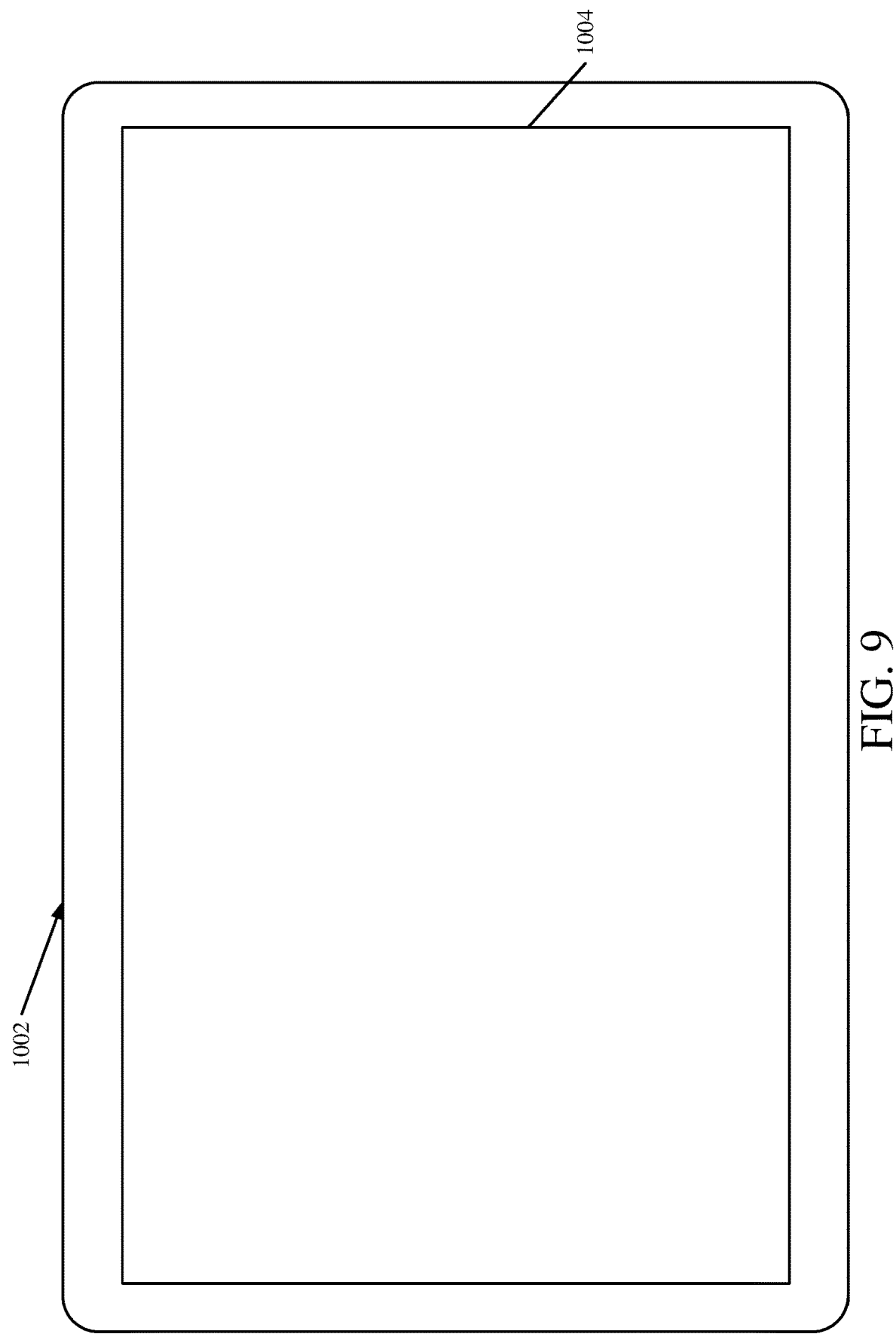
FIG. 9 shows one embodiment of a mobile computing device that may be configured to facilitate an interaction between a computing system and a user.

FIG. 9 shows one embodiment of a mobile computing device that may be configured to facilitate the interaction between a computing system and a user. In one embodiment, a distributed system is implemented on a portable computing device 1002. In FIG. 9, computing device 1002 is shown with user interface display screen 1004. In one embodiment, computing device 1002 and screen 1004 may be a tablet or a mobile phone. Screen 1004 may be a touch screen or a pen-enabled interface that receives inputs from a pen or stylus. It may also use an on-screen virtual keyboard. In another embodiment, computing device 1002 may also be attached to a keyboard or other user input device. Computing device 1002 may also illustratively receive voice inputs as well. In one embodiment, display screen 1004 facilitates the display of applications 122 through user interface component 104.

Figure 10:
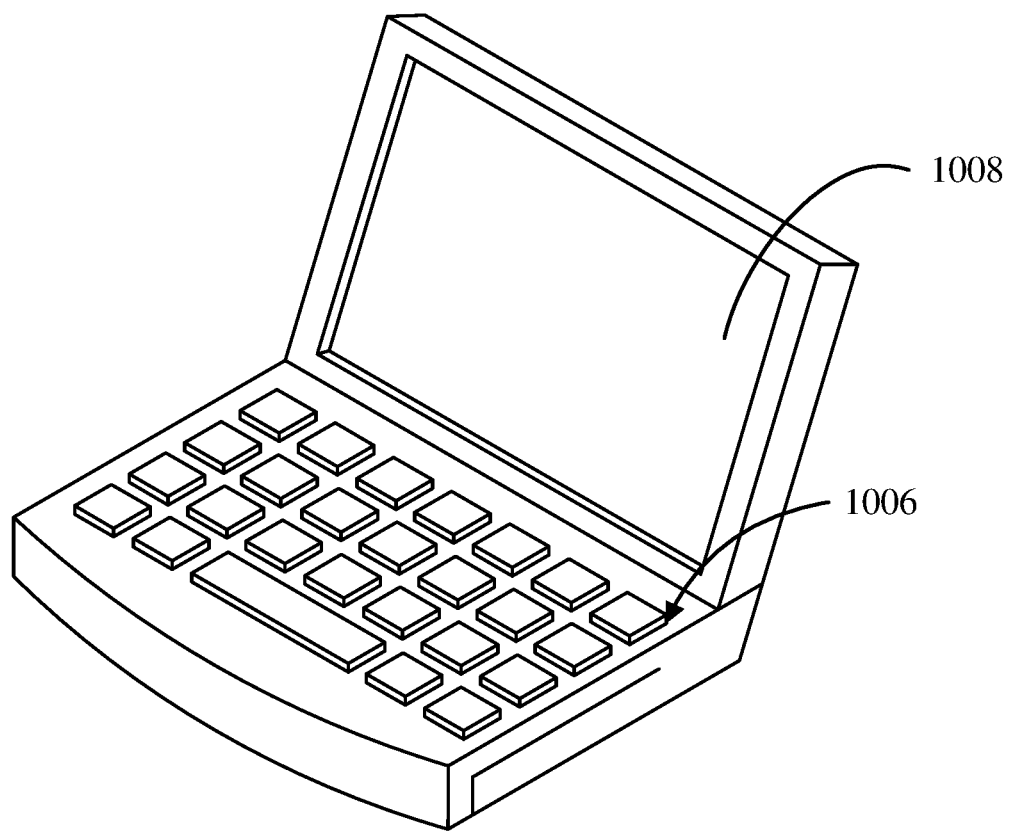
FIG. 10 shows one embodiment of a computing device that may be configured to facilitate an interaction between a computing system and a user.

FIG. 10 shows one embodiment of a computing device that may be configured to facilitate the interaction between a computing system and a user. For example, FIG. 10 provides an additional example of a computing device that may also be used to facilitate the interaction between user 102 and computing system 101. In FIG. 10 a mobile computer such as a laptop 1006 is provided. Laptop 1006 may include display 1008 that is capable of displaying images including application images, icons, web pages, photographs, and video, and control buttons selecting items shown on the display. In one embodiment, display screen 1006 facilities the display of applications 122 through user interface component 104.

Figure 11:
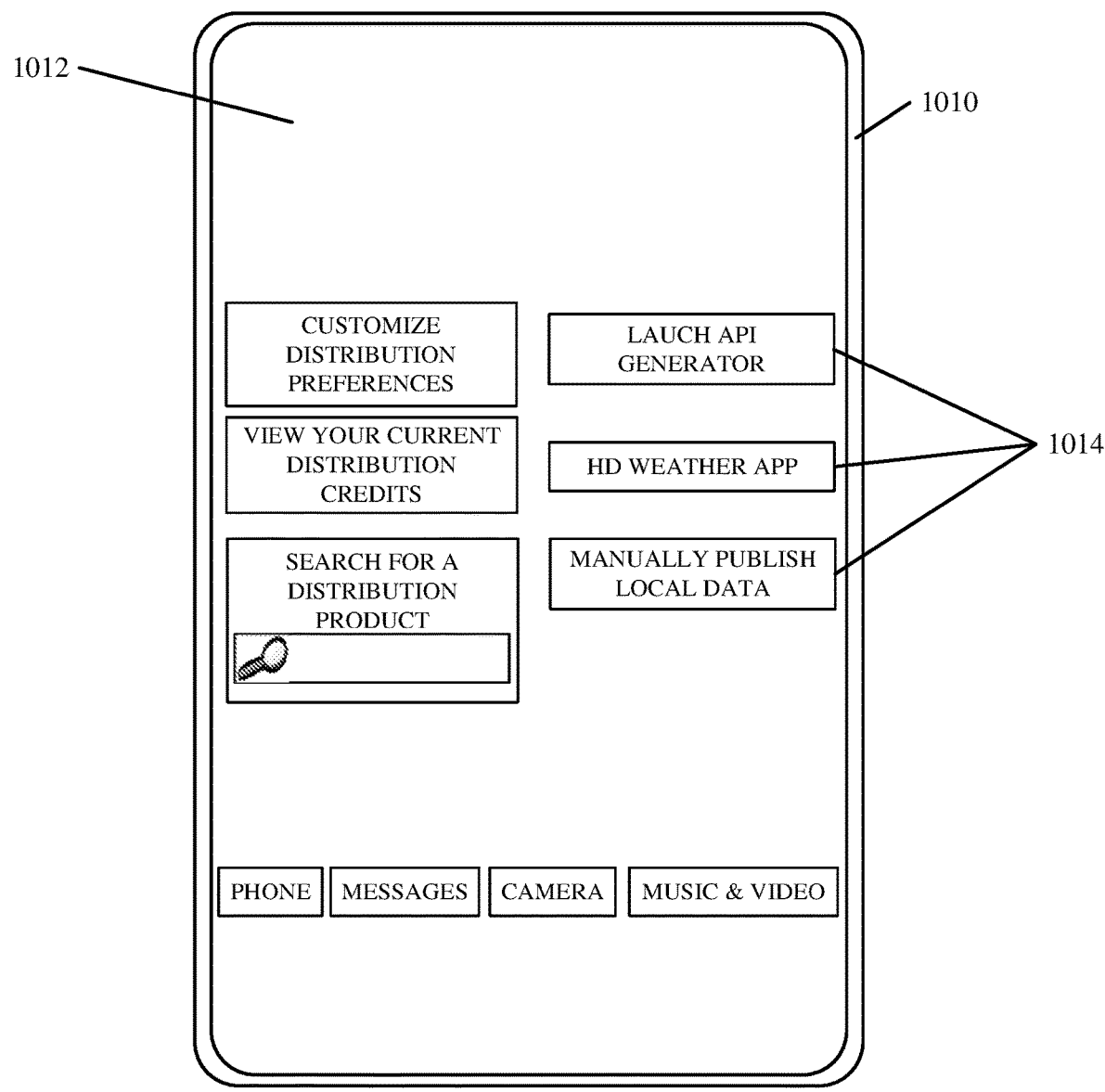
FIG. 11 shows one embodiment of a computing system implemented on a portable computing device.

FIG. 11 shows one embodiment of a computing system is implemented on a portable computing device. FIG. 11 is similar to FIG. 9 and further illustrates a mobile computing device that is a smart phone 1010. Smart phone 1010 has a touch sensitive display 1012 that displays icons or tiles or other user input mechanisms, such as actuable links to application interfaces. For example, applications 122 may be displayed as one or more application tiles or interface elements 1014. The user input mechanisms may be used by user 102 to run applications 122, make calls, perform data transfer operations, etc. In general, smart phone 1010 is built on a mobile operating system and offers more advanced computing capability and connectivity than a feature phone. In one embodiment, display screen 1012 facilities the display of applications 122 through user interface component 104.

A variety of user interfaces have been discussed. These user interfaces may include a wide variety of display configurations that have user input mechanisms. As mentioned above with respect to FIG. 10, for example, user input mechanisms may include search boxes, text boxes, check boxes, drop-down menus, icons, links, etc. The user input mechanisms may be actuated in a variety of ways. For example, where the user interface is displayed on a touch-sensitive display device, the inputs may be actuated by touch gestures or motions relative to the screen. Similarly, where the device supports voice recognition and processing, the inputs may be actuated by various voice commands. Where the display device comprises a laptop computer, user input mechanisms may include mechanical buttons. Mechanical buttons may include, for example, switches, joysticks, keyboard, thumb switches, etc. In addition, the display device may be configured to include a combination of mechanical (or hardware) and touch or voice input mechanisms. For example, the laptop as shown in FIG. 10 may include keyboard, mouse, and touch-sensitive display screen input mechanisms.

Various processors and servers have also been discussed. Processors and severs described herein may be functional parts of the system that facilitate the functionality of various components of the system. As similarly discussed above with respect to processor 106 (shown in FIG. 1), for example, the processor may be a functional part of the computing system and is activated by and facilitates the functionality of other components in the system. Servers may include any server that is configured to facilitate database services for the data stores of the system. The processors and servers may have separate circuitry and timing components that are not shown in the figures.

It will be noted that the above discussion has described a variety of different systems, components, modules, elements, and/or types of items. It should be understood that these can be implemented in any of a variety of ways. For example, they can be implemented as logic. It will be appreciated that such systems, components, and/or logic can be comprised of hardware items (such as processors and associated memory, or other processing components, some of which are described above) that perform the functions associated with those systems, components and/or logic. In addition, the systems, components and/or logic can be comprised of software that is loaded into a memory and is subsequently executed by a processor or server, or other computing component, as described above. The systems, components and/or logic can also be comprised of different combinations of hardware, software, firmware, etc., some examples of which are described herein. These are only some examples of different structures that can be used to form the systems, components and/or logic described above. Other structures can be used as well.

Figure 12:
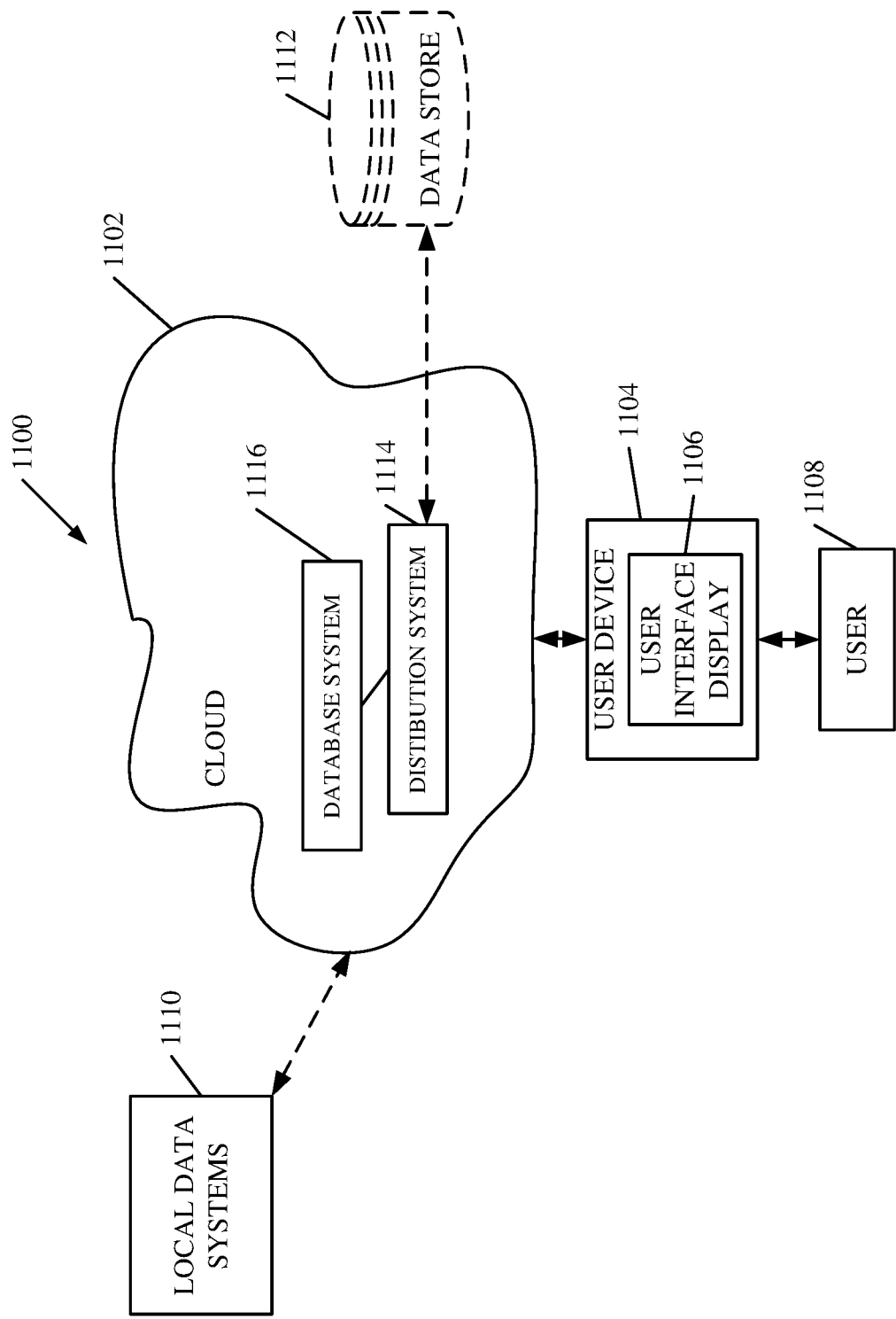
FIG. 12 illustrates a block diagram of one embodiment of a computing environment.

FIG. 12 illustrates a block diagram of one embodiment of a computing environment. In one embodiment, FIG. 12 is a block diagram of a cloud computing architecture 1100. In general, cloud computing allows for data distribution over a network connection, such network 1102, without requiring a knowledge of the physical location or a configuration of system 1114. Cloud computing may allow a service provider to provide access to a software application over the network and through a web portal such as a web browser application. In the embodiment shown in FIG. 12, cloud 1102 provides user devices 1104 (and user interface displays 1106) and thus users 1108 access to distribution system 1114. For instance, user 1108 may access distribution system 1114 and its associated components and their functions through an internet browser. The distribution system may supply database system 1116 and the corresponding data as a single point of access for user 1108. FIG. 12 also shows that data store 1112 and local data system 1110 may be included in cloud architecture 1100. The various components that interact with system 1114 may be included in cloud 1102 or separate from the cloud server. Where the components are not included in the cloud server 1102, they may be configured to communicate with those that are. As such, cloud architecture 1100 allows user 102 to access all the functionality of system 1114 and its data services through a single, intuitive point of access.

The cloud architecture discussed herein may include one or more configurations of either public or private cloud computing, or a combination of both public and private cloud computing. The level of security applied to the cloud computing environment may be uniquely configured by the vendor of the cloud services. In addition, the broker or vendor of local data systems may be able to configure the level of cloud environment security.

Figure 13:
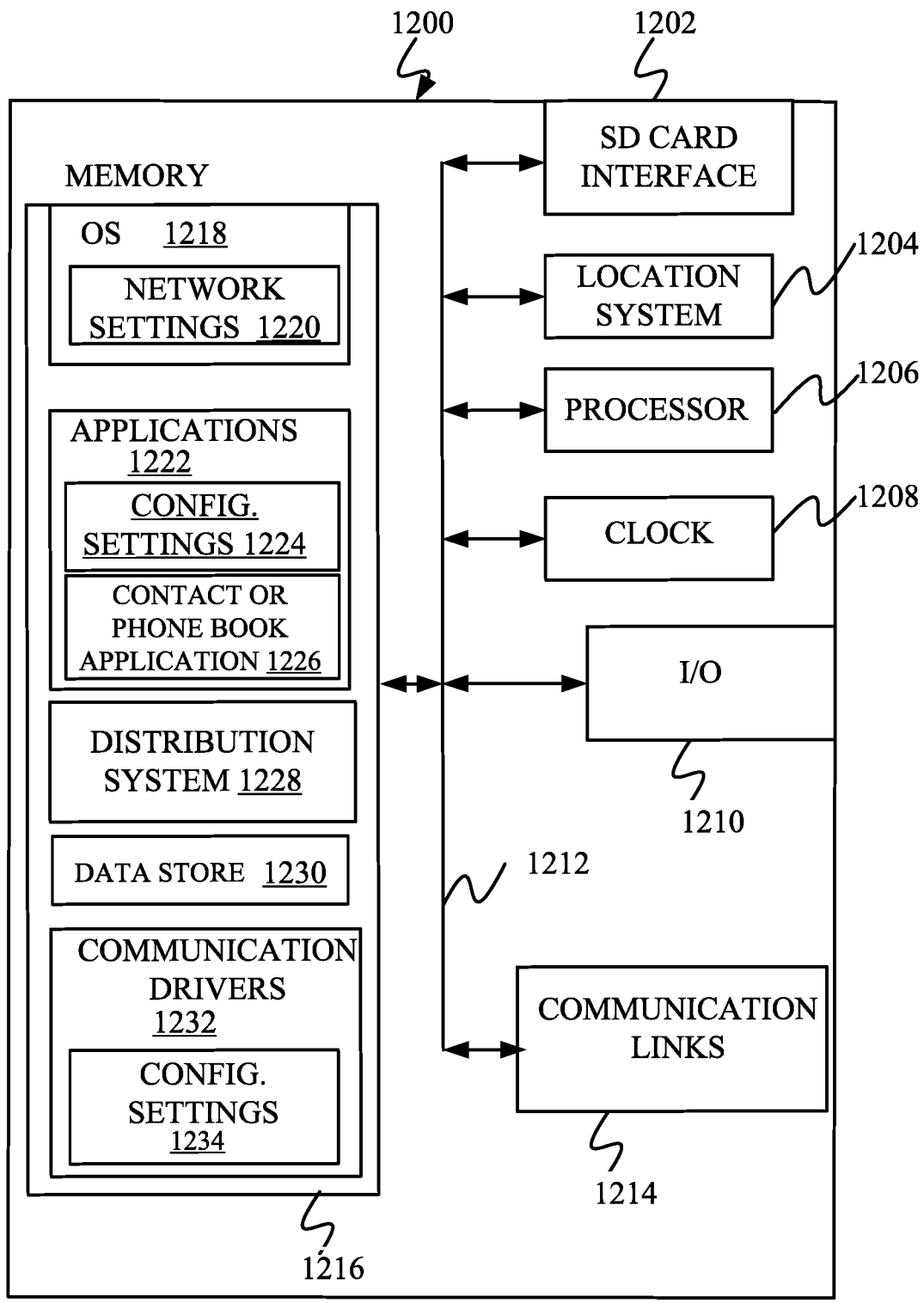
FIG. 13 illustrates a simplified block diagram of one embodiment of a computing device.

FIG. 13 illustrates a simplified block diagram of one embodiment of a computing device. For example, FIG. 13 illustrates a general block diagram of various components of computing device 1200 that may run the components of computing architecture 1100. Communication link 1214 is provided in device 1200 to allow device 1200 to communicate with the various components of system 101 and other devices. Link 1214 may include a variety of channels for receiving information and connecting device 1200 to a network, such as network 134. As such, device 1200 may be configured to communicate to other devices and applications operating in or through cloud 1102.

In one embodiment, the various component of device 1200 are interconnected by a communication bus, generally indicated by 1212. Applications and information may be received on a removable or permanent Secure Digital (SD) card that is connected to SD card interface 1202. Thus, both communication links 1214 and SD card interface 1202 communicate with processor 1206. These components may communicate via communication bus 1212, and are also connected to location system 1204, clock 1208 and input/output component (I/O) 1210.

Clock 1208 may include a real time clock that outputs a time and date, and may provide timing functionality to processor 1206. Location system 1204 may include a component that determines and/or outputs a geographical location of device 1200. Location system 1204 may include a variety of location system configurations. For example, these configurations may include a global positioning system (GPS) receiver, a long range navigation system such as LORAN, a dead reckoning system, a cellular triangulation system, or other positioning system. Location system 1204 may also provide functionality for generating map images or geographical depictions based on the determined location.

I/O components 1210 may include components such as hardware and software input buttons, touch sensors, optical sensors, microphones, touch sensitive display screens, proximity sensors, light sensors, accelerometers, orientation sensors, compass sensors. Output components may include display devices, user interface components, a speaker, a vibration mechanism, and/or a printer port, for example. A variety of other I/O components may also be used.

Memory 1216 illustratively shows storage of operating system (OS) 1218, network settings 1220, applications 1222, configuration settings 1224, contact or phone book application 1226, distribution system 1228, data store 1230, communication drivers 1232, and communication configuration settings 1234. Memory 1216 may include volatile and non-volatile memory storage, computer storage media, and any other type of memory storage.

Applications 1222 may include applications that have been previously stored on device 1200 or applications that are installed during use of distribution system 1228, for example. Applications 1222 may also include cloud-based applications that are provided by a software as a service (SaaS).

Figure 14:
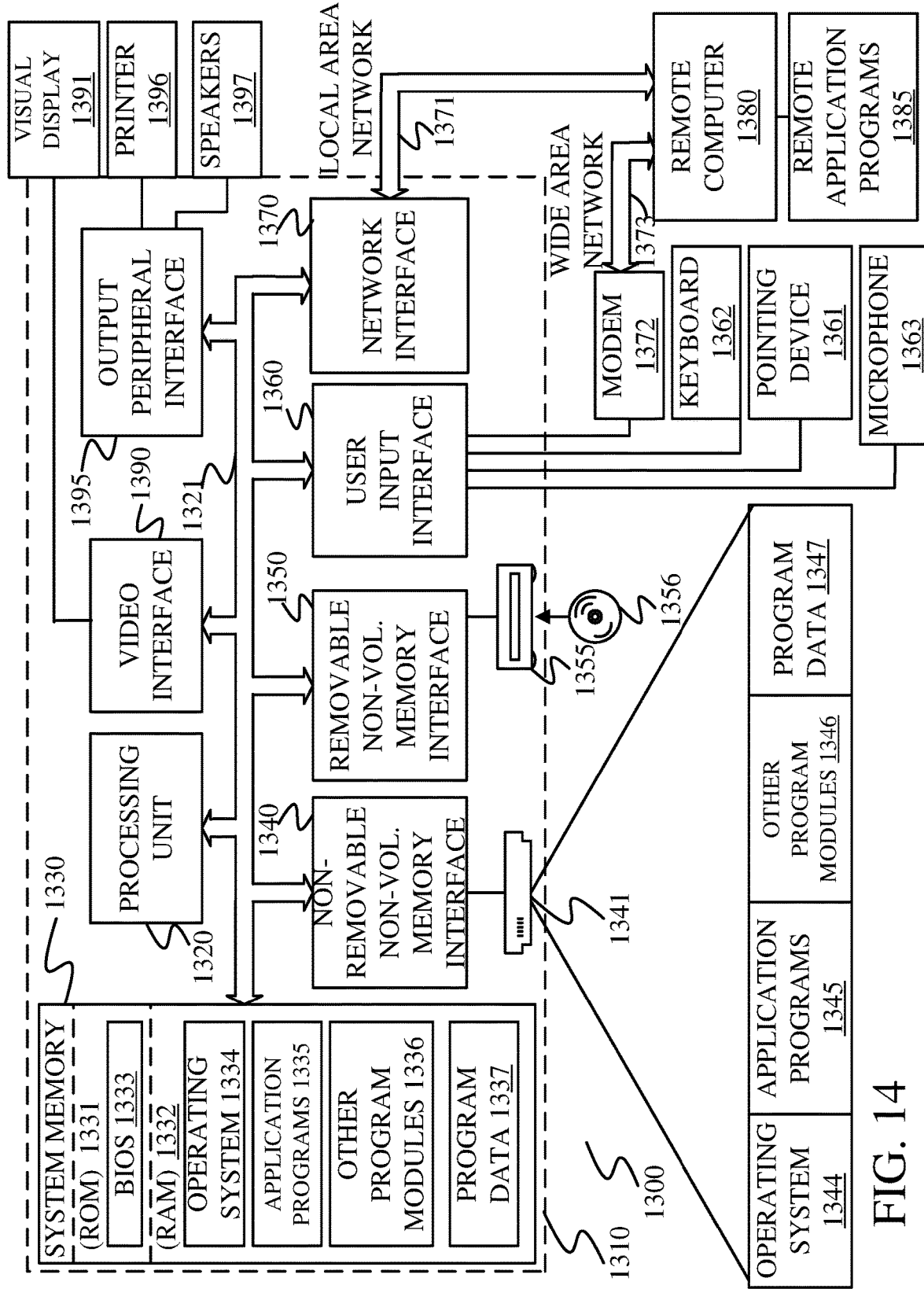
FIG. 14 illustrates a block diagram of one embodiment of an encompassing computing environment.

FIG. 14 illustrates a block diagram of one embodiment of an encompassing computing environment. FIG. 14 illustratively comprises a general-purpose computing device configured as a computer 1310. Computer 1310 may include a variety of components that are configured to facilitate the functionality of a distribution system, for example. Computer 1310 may include a processing unit 1320, a system memory 1330 and a communication bus 1321 that may facilitate communication between the various components. The system bus 1321 may be any of several types of bus structures including a memory bus or memory controller, a peripheral bus, and a local bus using any of a variety of bus architectures. The various applications and implementations of distribution system 100, as described herein, may be deployed in corresponding elements of FIG. 14.

Computer 1310 may comprise a variety of computer readable media. Computer readable media may be any available media that may be accessed by computer 1310 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computer 1310. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 10 illustrates operating system 1334, application programs 1335, other program modules 1336, and program data 1337.

The computer 1310 may also include other removable/non-removable volatile/nonvolatile computer storage media. By way of example only, FIG. 10 illustrates a hard disk drive 1341 that reads from or writes to non-removable, nonvolatile magnetic media, a magnetic disk drive 1351, nonvolatile magnetic disk 1352, an optical disk drive 1355, and nonvolatile optical disk 1356. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

Alternatively, or in addition, the functionality described herein may be performed, at least in part, by one or more hardware logic components. For example, and without limitation, illustrative types of hardware logic components that may be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 1310. In FIG. 14, for example, hard disk drive 1341 is illustrated as storing operating system 1344, application programs 1345, other program modules 1346, and program data 1347. Note that these components may either be the same as or different from operating system 1334, application programs 1335, other program modules 1336, and program data 1337.

A user may enter commands and information into the computer 1310 through input devices such as a keyboard 1362, a microphone 1363, and a pointing device 1361, such as a mouse, trackball or touch pad. Other input devices (not shown) may include a joystick, game pad, satellite dish, scanner, or the like. These and other input devices are often connected to the processing unit 1320 through a user input interface 1360 that is coupled to the system bus, but may be connected by other interface and bus structures. A visual display 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1395.

The computer 1310 is operated in a networked environment using logical connections (such as a local area network—LAN, or wide area network WAN) to one or more remote computers, such as a remote computer 1380.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. In a networked environment, program modules may be stored in a remote memory storage device. FIG. 14 illustrates, for example, that remote application programs 1385 may reside on remote computer 1380.

At least some of the present embodiments discussed herein provide a system that assigns value to data by which data producers, data aggregators, and data consumers may collect, distribute, sell, or trade data. The Internet of Things is an example of a system generating data from sensors and other electronic devices at an ever increasing rate. When this data is combined with data from traditional sources, the value and utility of the sources increases, leading to the potential to analyze data for social good, research and discovery, achieving business objectives, and an overall increase in accuracy and validity of data use on a daily basis. Embodiments of the current disclosure may be directed towards and electronic marketplace that utilizes a platform to assign a unique token to a participant or local data source, tracking the data published by the participant, and assigning a value to the data based on a combination of data valuation metrics.

Although the present invention has been described with reference to preferred embodiments, those skilled in the art will recognize that changes may be made in form and detail without departing from the spirit and scope of the invention.

What is claimed is:

1. A method performed by a computing system, the method comprising:
    identifying a geographic location of interest to generate roadway condition information;
    identifying a client device based on the identified geographic location of interest;
    sending a communication over a communication network to the identified client device, the communication requesting sensor data indicative of a roadway condition in the identified geographic location of interest;
    receiving, from the identified client device in response to the communication, the sensor data acquired from one or more sensors;
    generating the roadway condition information based on the received sensor data;
    determining an incentive metric based on distribution of the generated roadway condition information; and
    generating a data record that assigns the incentive metric to the client device.

2. The method of claim 1, wherein the one or more sensors comprise one or more imaging sensors.

3. The method of claim 2, wherein the client device comprises a mobile device associated with a user and the one or more imaging sensors comprise one or more cameras.

4. The method of claim 2, wherein the one or more imaging sensors are separate from the client device, and the client device acquires the sensor data from the one or more imaging sensors over a communication link.

5. The method of claim 1, wherein the sensor data is indicative of a weather condition at the geographic location of interest.

6. The method of claim 5, wherein the sensor data indicative of a weather condition at the geographic location of interest comprises an indication relative to precipitation at the geographic location of interest.

7. The method of claim 1, wherein the client device is associated with a vehicle.

8. The method of claim 1, wherein the one or more sensors are associated with a vehicle.

9. The method of claim 1, wherein the sensor data is indicative of a traffic condition at the geographic location of interest.

10. The method of claim 1, wherein receiving the sensor data comprises receiving the sensor data from the client device over one of a plurality of different communication channels associated with the client device.

11. A computing system comprising:
    at least one processor; and
    memory storing instructions executable by the at least one processor, wherein the instructions, when executed, cause the computing system to:
        identify a geographic location of interest to generate roadway condition information;
        identify a client device in the geographic location of interest based on the identified geographic location of interest;
        send a communication over a communication network to the identified client device, the communication requesting sensor data indicative of a roadway condition in the identified geographic location of interest;
        receive, from the identified client device in response to the communication, the sensor data acquired from one or more sensors;
        generate the roadway condition information based on the received sensor data; and determine an incentive metric based on distribution of the generated roadway condition information; and
generate a data record that assigns the incentive metric to the client device.

12. The computing system of claim 11, wherein the one or more sensors comprise one or more imaging sensors.

13. The computing system of claim 12, wherein the client device comprises a mobile device associated with a user and the one or more imaging sensors comprise one or more cameras.

14. The computing system of claim 12, wherein the one or more imaging sensors are separate from the client device, and the client device acquires the sensor data from the one or more imaging sensors over a communication link.

15. The computing system of claim 11, wherein the sensor data is indicative of a weather condition at the geographic location of interest.

16. The computing system of claim 15, wherein the sensor data indicative of a weather condition at the geographic location of interest comprises and indication relative to precipitation at the geographic location of interest.

17. The computing system of claim 11, wherein the client device is associated with a vehicle.

18. The computing system of claim 11, wherein the one or more sensors are associated with a vehicle.

19. The computing system of claim 11, wherein the sensor data is indicative of a traffic condition at the geographic location of interest.

20. The computing system of claim 11, wherein receiving the sensor data comprises receiving the sensor data from the client device over one of a plurality of different communication channels associated with the client device.

* * * * *